(12) United States Patent
Liberg et al.

(10) Patent No.: US 11,374,730 B2
(45) Date of Patent: Jun. 28, 2022

(54) EXPLICIT MEASUREMENT DEFINITION

(71) Applicant: Telefonaktiebolaget LM Ericsson (publ), Stockholm (SE)

(72) Inventors: Olof Liberg, Stockholm (SE); Joakim Axmon, Limhamn (SE); Mats Folke, Vällingby (SE); Andreas Höglund, Solna (SE); Yutao Sui, Solna (SE); Martin Van Der Zee, Malmö (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/766,208

(22) PCT Filed: Nov. 23, 2018

(86) PCT No.: PCT/EP2018/082442
§ 371 (c)(1),
(2) Date: May 21, 2020

(87) PCT Pub. No.: WO2019/101965
PCT Pub. Date: May 31, 2019

(65) Prior Publication Data
US 2020/0374099 A1 Nov. 26, 2020

Related U.S. Application Data

(60) Provisional application No. 62/590,477, filed on Nov. 24, 2017.

(51) Int. Cl.
*H04L 27/00* (2006.01)
*H04L 7/00* (2006.01)
*H04B 7/06* (2006.01)

(52) U.S. Cl.
CPC .......... *H04L 7/0091* (2013.01); *H04B 7/06* (2013.01)

(58) Field of Classification Search
CPC .... H04L 7/0091; H04B 7/06; H04W 52/0229; H04W 52/0216
(Continued)

(56) References Cited

U.S. PATENT DOCUMENTS

2018/0234169 A1* 8/2018 Sridharan .............. H04L 1/08
2020/0169956 A1* 5/2020 Sun .................. H04L 12/2803

FOREIGN PATENT DOCUMENTS

JP 2013066208 4/2013
WO WO2009002093 12/2008

OTHER PUBLICATIONS

PCT Notification of Transmittal of the International Search Report and the Written Opinion of the International Searching Authority, or the Declaration for International application No. PCT/EP2018/082442—dated Feb. 4, 2019.
(Continued)

*Primary Examiner* — Zewdu A Kassa
(74) *Attorney, Agent, or Firm* — Baker Botts, LLP

(57) ABSTRACT

According to certain embodiments, a method (500) by a wireless device (110) includes receiving information relating to a Narrowband Secondary Synchronization Signal (NSSS) transmit diversity scheme. The information indicates a number of NSSS occasions that use different NSSS transmit diversity configurations. Based on the NSSS transmit diversity scheme, at least one measurement is performed across NSSS occasions.

30 Claims, 26 Drawing Sheets

(58) Field of Classification Search
USPC .................... 375/299, 298, 295, 219, 316
See application file for complete search history.

(56) References Cited

OTHER PUBLICATIONS

3GPP TSG-RAN WG4 #85; Reno, USA; Qualcomm Incorporated; Title: NSSS antenna port variation impact to NSSS-based measurement in FeNB-IoT (R4-1712860)—Nov. 27-Dec. 1, 2017.
3GPP TSG RAN WG4 Meeting #85; Reno, Nevada; Source: Ericsson; Title: On NSSS measurement accuracy in transmit diversity (R4-1713582)—Nov. 27-Dec. 1, 2017.
3GPP TSG-RAN WG4 Meeting #85; Reno, Nevada; Title: [DRAFT] LS reply on narrowband measurement accuracy enhancement; Source: RAN WG4; To: RAN WG1 (R4-1713583)—Nov. 27-Dec. 1, 2017.
"Narrowband measurement accuracy improvements for NB-IoT," R1-1801496, Ericsson, 3GPP TSG-RAN WG1#92, Feb. 26-Mar. 2, 2018.
Japan Patent Office, Notice of Reasons for Rejection in JP Application No. 2020-528095 dated Aug. 3, 2021 (translated).
Korea Patent Office, Official Action in KR Application No. 519987015051 dated Sep. 26, 2021 (no translation).
"Ad hoc minutes on FeNB-IOT/eNB-IOT," R4-1711725, Huawei, HiSilicon, 3GPP TSG-RAN WG4 Meeting #84bis, Oct. 9-13, 2017.
Communication Pursuant to Article 94(3) EPC in Application No. 18 808 333.1-1205 dated Mar. 16, 2022.

\* cited by examiner

EXPLICIT MEASUREMENT DEFINITION

PRIORITY

This nonprovisional application is a U.S. National Stage Filing under 35 U.S.C. § 371 of International Patent Application Serial No. PCT/EP2018/082442 filed Nov. 23, 2018 and entitled "Explicit Measurement Definition" which claims priority to U.S. Provisional Patent Application No. 62/590,477 filed Nov. 24, 2017 both of which are hereby incorporated by reference in their entirety.

BACKGROUND

In Release 13, 3GPP developed Narrowband Internet-of-Things (NB-IoT). This new radio access technology provides connectivity to services and applications demanding qualities such as reliable indoor coverage and high capacity in combination with low device complexity and optimized power consumption.

NB-IoT supports a set of reference signals among which include Narrowband Reference Signal (NRS) and Narrowband Secondary Synchronization Signal (NSSS).

NRS is a downlink reference signal transmitted in each configured NB-IoT subframe. It supports user equipment (UE) radio resource and link quality related measurements. FIG. 1 depicts the mapping of NRS resource elements (RE) on a subframe. As depicted, NRS may be transmitted over one or two antenna ports.

NSSS is a downlink reference signal transmitted with a periodicity of 20 ms. It supports synchronization in time and frequency as well as identification of the cell. Its resource elements are mapped on a full subframe with exception for the first three OFDM symbols as depicted in FIG. 2.

In NB-IoT, the reference point for the transmission of physical signals and channels is the antenna port. This is an abstract concept invented by 3GPP, and the 3GPP specifications do not disclose how signals defined at a certain antenna port is mapped to a physical antenna port, which defines the input to the radiating antenna elements. This concept is hereafter referred to as the used transmission diversity scheme. The mathematical relation between antenna ports and physical antenna ports is known to be defined by a precoding matrix.

FIG. 3 illustrates this concept using the NRS as an example. The NRS are transmitted from one or two antenna ports numbered as 2000 and 2001.

To ensure the NRS can be used by a UE to estimate the radio propagation channel for equalizing a received Narrowband Physical Downlink Control Channel (NPDCCH), Narrowband Physical Downlink Shared Channel (NPDSCH), or a Narrowband Physical Broadcast Channel (NPBCH) transmission, the NPDCCH, NPDSCH and NPBCH are defined to use the same antenna ports as the NRS. This also implies that the same transmission diversity scheme will apply for the NRS, NPDCCH, NPDSCH and NPBCH. These channels then share the same degree of transmit diversity.

The same association between the NRS and NSSS does not exist. On the contrary the 3GPP specifications specify that a "UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe."

The purpose of the NSSS specification is to indicate to the UE that coherent combination of consecutively received NSSS transmission cannot be assumed. Instead, the UE is supposed to perform non-coherent combination of received NSSS transmissions. The specification also allows the base station (BS) side to optimize the transmit diversity scheme, such as, for example, the precoding matrix, on a case by case basis.

To support Radio Resource management in idle and connected mode a NB-IoT UE is mandated to support Narrowband Reference Signal Received Power measurements defined as TS 36.214 E-UTRA Physical layer measurements:

Narrowband Reference signal received power (NRSRP), is defined as the linear average over the power contributions (in [W]) of the resource elements that carry narrowband specific reference signals within the considered measurement frequency bandwidth.

For NRS based NRSRP determination the narrowband reference signals for the first antenna port ($R_{2000}$) according to TS 36.211 [3] shall be used. If the UE can reliably detect that a second antenna port ($R_{2001}$) is available it may use the second antenna port in addition to the first antenna port to determine NRSRP.

The reference point for the NRSRP shall be the antenna connector of the UE.

In Release 15, it has been identified that the quality of the NRSRP measurement can be improved if the UE can perform NRSRP measurements on the NSSS as an alternative or a complement to the NRS. The fundamental reason for this opportunity is the higher energy density of the NSSS compared to the NRS.

There currently exist certain challenges. For example, as described above, there is no association between the transmit diversity scheme used for NRS and for NSSS. This implies that there may be a mismatch between NRSRPNsss measured over NSSS and NRSRPNRs measured over NRS.

Assume for example a case where the two NRS antenna ports are mapped to two physical antenna ports using the fixed precoding matrix illustrated on the left in FIG. 4 while the NSSS are transmitted with a precoding matrix that alternates in time as illustrated on the right in FIG. 4.

The first problem is that a UE that measures NRSRPNRs on antenna port 2000 as mandated by the 3GPP specifications may see a difference in measured NRSRPNRs and NRSRPNsss in case it only samples NRS and NSSS at time instances N+1, N+3 and so on.

The second problem is that also a UE that continuously measures NRSRPNRs on antenna port 2000 may see a difference in measured NRSRPNRs and NRSRPNsss since the NSSS is transmitted using alternating transmit diversity schemes while the NRS is transmitted with a fixed transmit diversity scheme.

This issue has also been verified by simulations where NSSS transmission with alternating precoding matrix is assumed along with time invariant single tap channel conditions. In this example, it is further assumed that the UE only samples every second instance of the NSSS transmissions at times T=N, N+2 and so on.

With this setup, the UE will receive the linear combination of two constantly phase shifted replicas of the transmitted signal. The random phase shifts α and β imposed on the signals are introduced by the Multiple Input Single Output (MISO) channel between the BS and UE. The linear combination may be destructive or constructive. In the former case in the worst situation the two signal paths may cancel each other completely, and in the latter case they may result in that twice the energy is received. FIG. 5 exemplifies this setup.

The power of the linear combination of the signal may be represented as $$\frac{1}{\sqrt{2}}e^{j\alpha} + \frac{1}{\sqrt{2}}e^{j\beta}.$$

Looking at the Cumulative Distribution Function (CDF) of $$\left|\frac{1}{\sqrt{2}}e^{j\alpha} + \frac{1}{\sqrt{2}}e^{j\beta}\right|^2$$

in FIG. 6, where $\alpha$ and $\beta$ each are randomized within $[0,2\pi]$, it is clear that the $5^{th}$ percentile represents significant annihilation of the transmitted signals at the receiver. This proves the problematic dependency between the UE measurement configuration and the used transmission scheme by the base station.

SUMMARY

Certain aspects of the present disclosure and their embodiments may provide solutions to these or other challenges by allowing a narrowband Internet-of-Things (NB-IoT) wireless device to perform Radio Resource Management (RRM) measurements on the Narrowband Secondary Synchronization Signal (NSSS) in addition to the Narrowband Reference Signal (NRS). According to certain embodiments, the network may inform the wireless device of how to configure its measurement setup to avoid the problems described above.

According to certain embodiments, a method by a wireless device includes receiving information relating to a NSSS transmit diversity scheme. The information indicates a number of NSSS occasions that use different NSSS transmit diversity configurations. The received indication is for use in performing at least one measurement to be performed across NSSS occasions. In some aspects, the indication indicates a set of NSSS occasions in which each NSSS occasion uses a unique transmit diversity scheme. In some aspects, the wireless device uses the received indication to perform at least one measurement across the NSSS occasions.

According to certain embodiments, a wireless includes memory operable to store instructions and processing circuitry operable to execute the instructions to cause the wireless device to receive information relating to a NSSS transmit diversity scheme. The information indicates a number of consecutive NSSS occasions that use different NSSS transmit diversity configurations, i.e. different precoders for mapping the NSSS from the antenna ports to the physical antenna ports. This number can be referred to as NSSS transmit diversity, or NSSS precoder (precoding matrix), periodicity. The indication of the NSSS transmit diversity scheme provides for at least one measurement to be performed across NSSS occasions. In some aspects, the processing circuitry is operable to execute the instructions to cause the wireless device to perform at least one measurement across the set of NSSS occasions that defines a full NSSS transmit diversity, or precoder, period.

According to certain embodiments, a method by a network node includes determining a set of NSSS transmit diversity schemes for transmitting a NSSS signal and transmitting information relating to the NSSS transmit diversity schemes to a wireless device for performance by the wireless device of at least one measurement across the NSSS occasionstransmissions that defines a NSSS transmit diversity period. The information indicates a number of NSSS occasions that use different NSSS transmit diversity configurations, i.e. the NSSS transmit diversity period.

According to certain embodiments, a network node includes memory operable to store instructions and processing circuitry operable to execute the instructions to cause the network node to determine a NSSS transmit diversity scheme for transmitting a NSSS signal and transmit information relating to the NSSS transmit diversity scheme to a wireless device for performance by the wireless device of at least one measurement across NSSS occasions. The information indicates a number of NSSS occasions that use different NSSS transmit diversity configurations.

Certain embodiments may provide one or more of the following technical advantages. As an example, an advantage of certain embodiments may be that a wireless device, such as a user equipment (UE), is allowed to use the NSSS, in complement to NRS, to estimate the Narrowband Reference Signal Received Power (NRSRP), Narrowband Reference Signal Receive Quality (NRSRQ), and New Received Signal Strength Indicator (NRSSI) in a predictable and accurate manner.

Certain embodiments may include none, some, or all of these advantages. Certain embodiments may include other advantages, as would be understood by a person having ordinary skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments are described in FIGS. 1-30 of the drawings, like numerals being used for like and corresponding parts of the various drawings. Although the described techniques are focused on Narrowband Reference Signal Received Power (NRSRP), the techniques apply generically to UE radio resource management (RRM) measurement metrics such as Reference Signal Received Power (RSRP), Received Signal Strength Indicator (RSSI) and Reference Signal Received Quality (RSRQ).

Certain embodiments may include functionality for explicit measurement definition. According to certain embodiments, for example, the network may inform the wireless device how to configure the wireless device's measurement setup to avoid the problems described above.

In the example described above and illustrated in FIG. 5, the network would inform the wireless device to make pairwise NRSRPNsss measurements at time instances T=N and N+1. The wireless device would then alternate between sampling destructive and constructive combination of the transmitted signals to, on average, estimate a correct NRSRP level.

Figure 1:
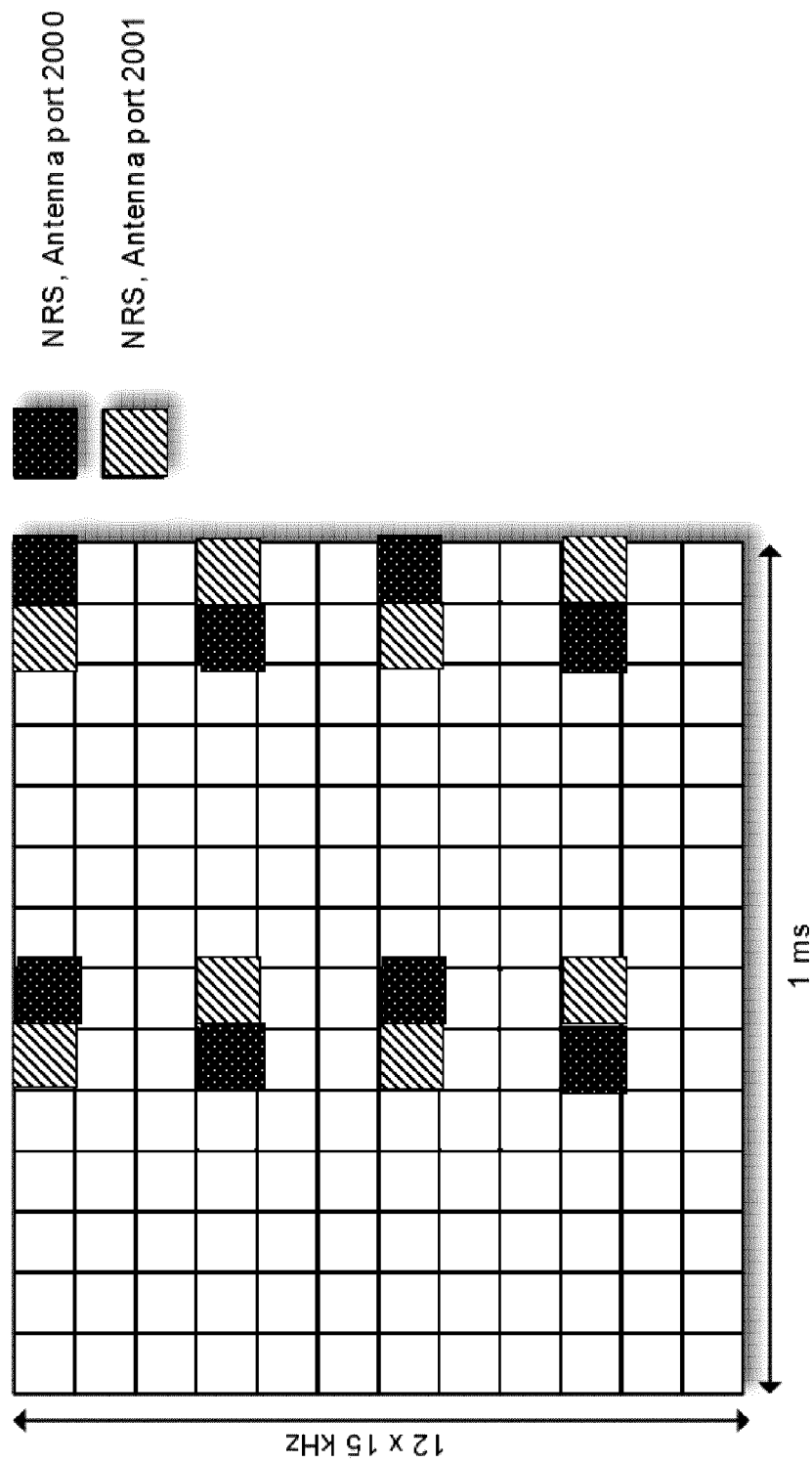
FIG. 1 illustrates the mapping of Narrowband Reference Signal (NRS) resource elements (REs) on a subframe.
Figure 2:
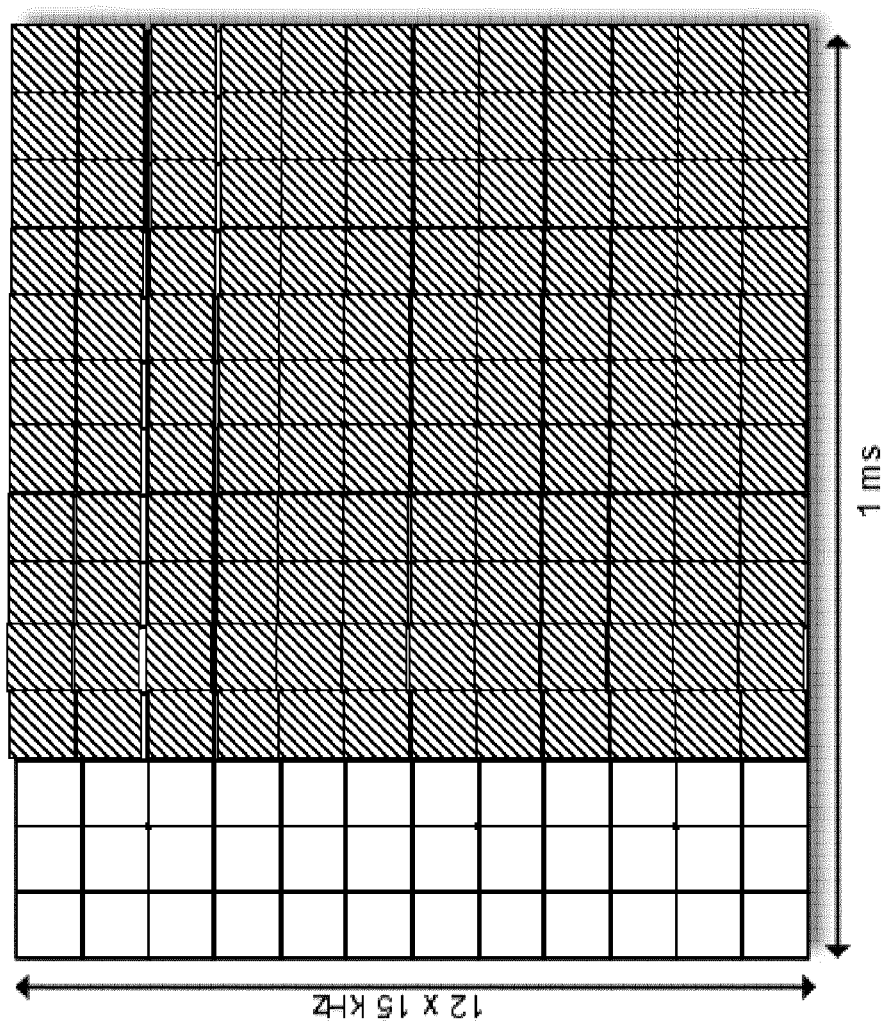
FIG. 2 illustrates the mapping of Narrowband Secondary Synchronization Signal (NSSS) REs on a subframe.
Figure 3:
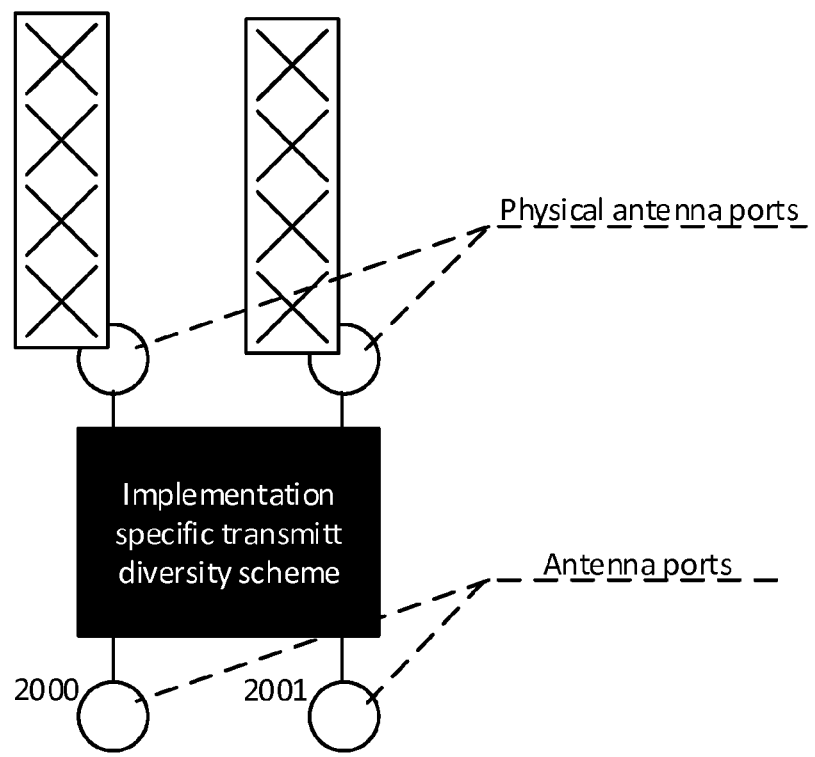
FIG. 3 illustrates the transmission diversity scheme concept using NRS as an example.
Figure 4:
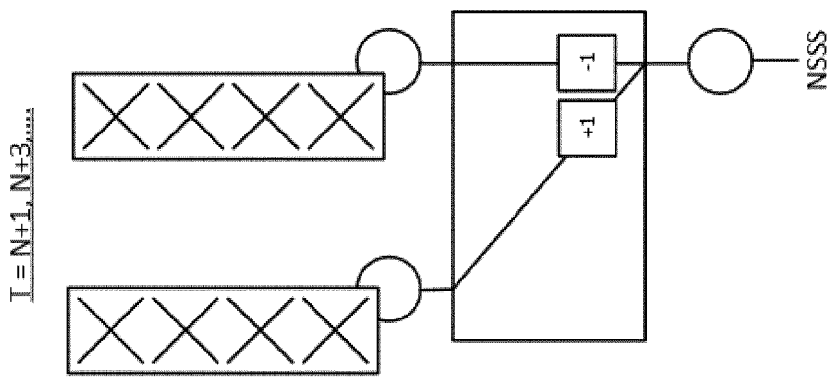
FIG. 4 illustrates a mapping of two NRS antenna ports to two physical antenna ports using the fixed precoding matrix.
Figure 4:
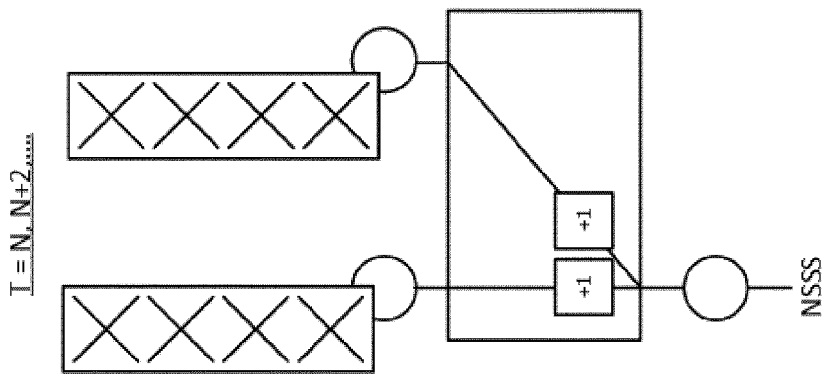
Figure 4:
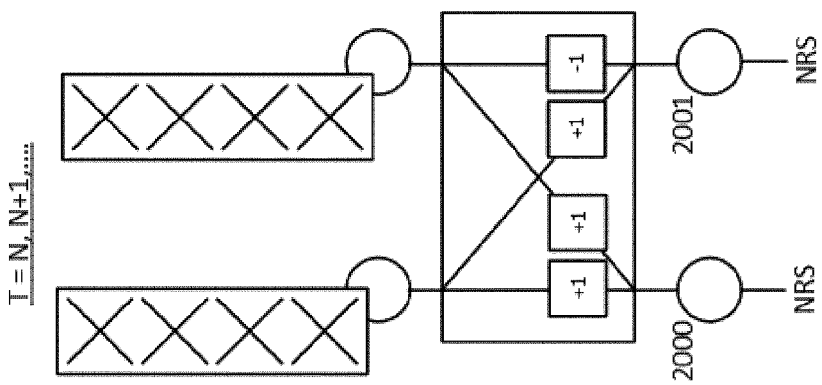
Figure 5:
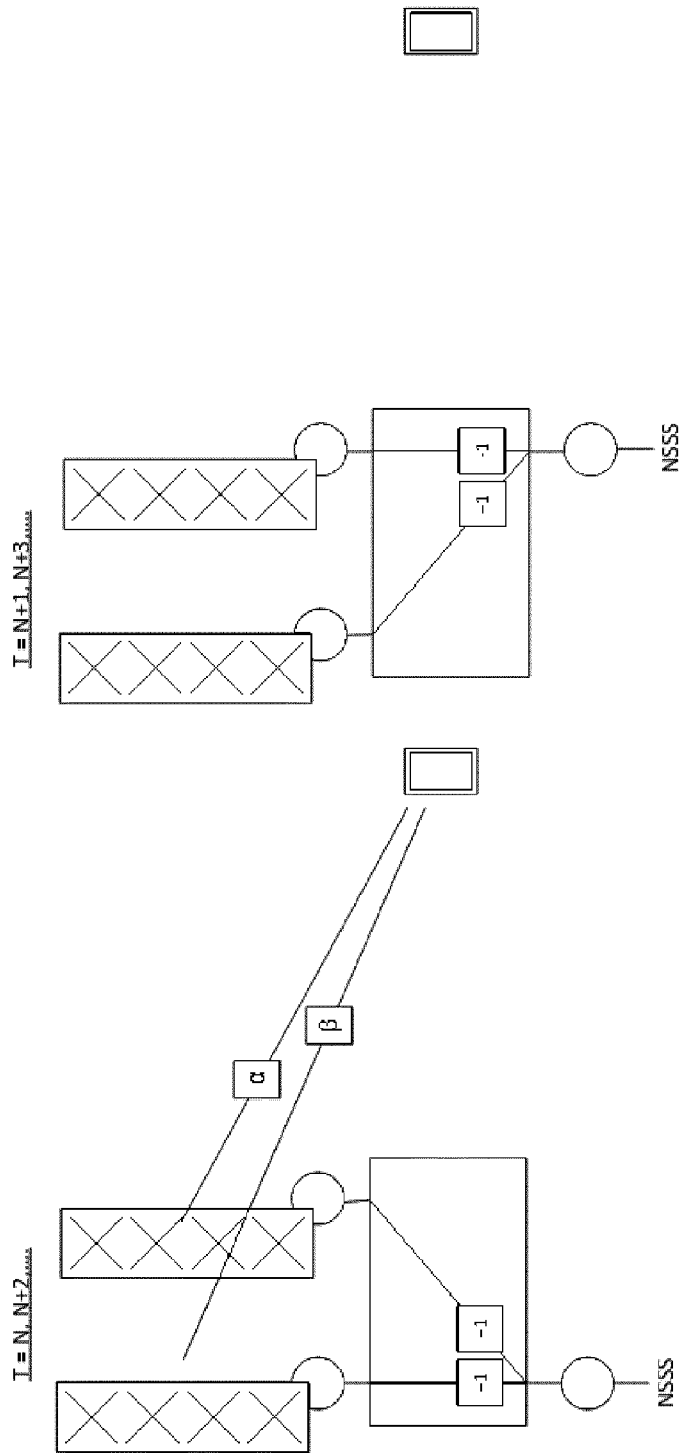
FIG. 5 illustrates an example NSSS transmission with alternating precoding matrix is along with time invariant single tap channel conditions.
Figure 6:
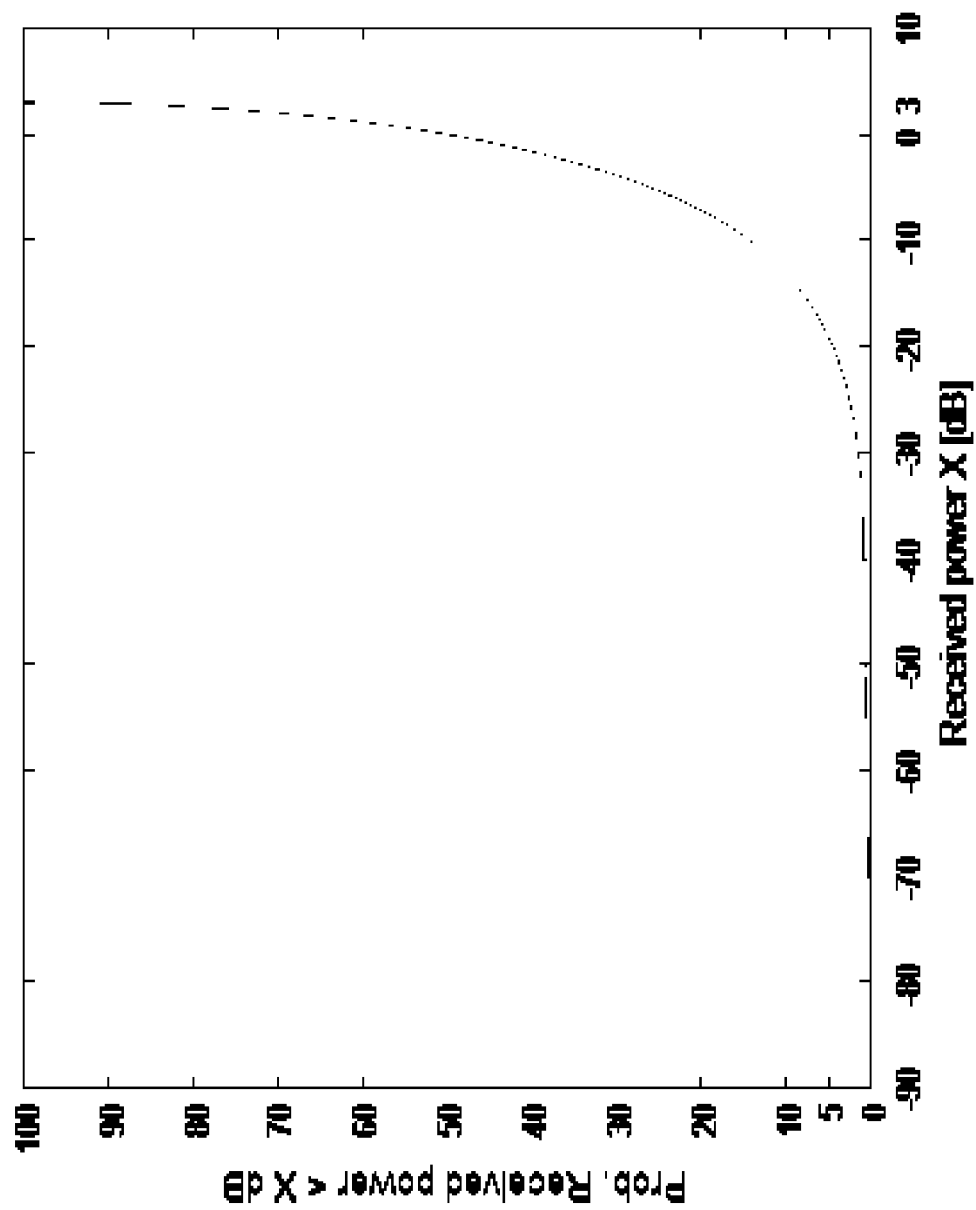
FIG. 6 illustrates CDF.
Figure 7:
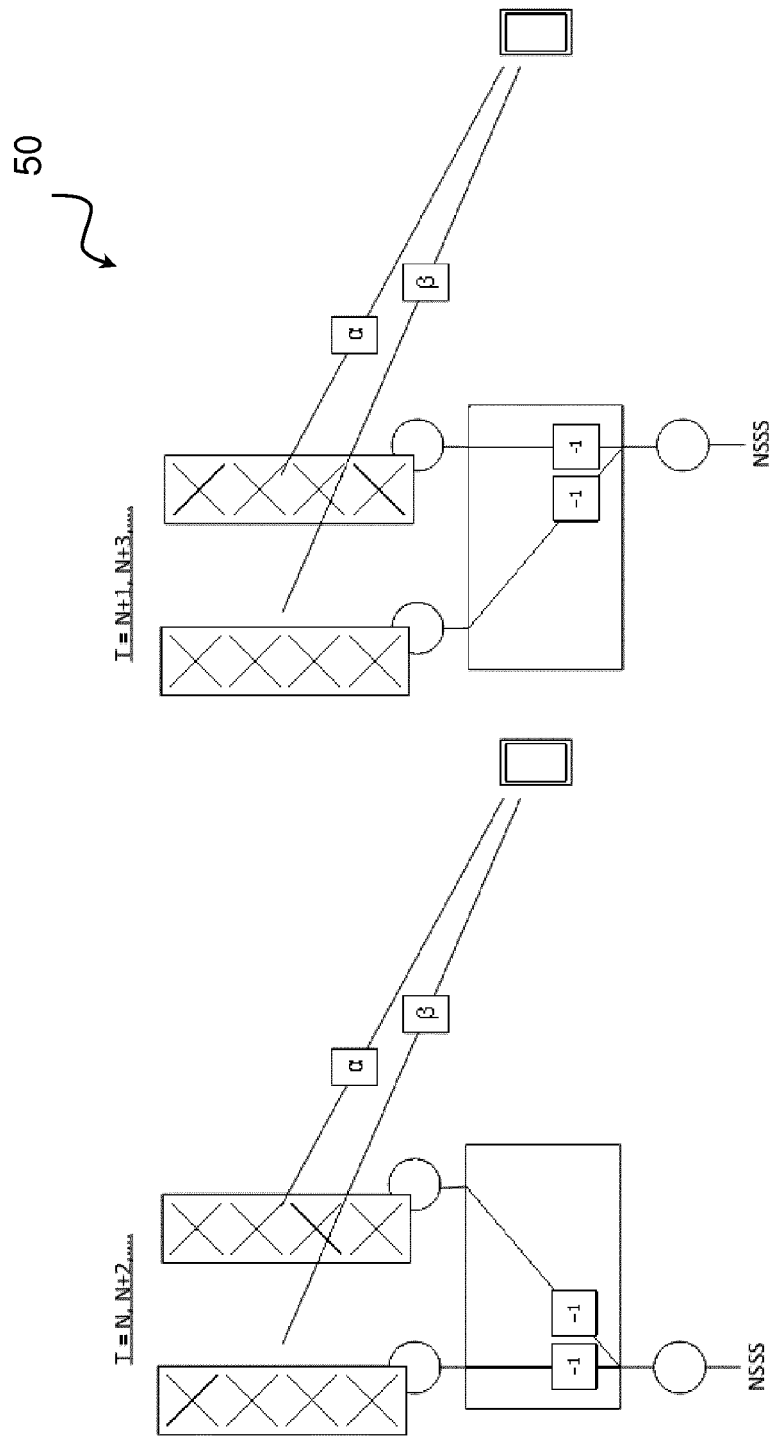
FIG. 7 illustrates an example NSSS transmit diversity scheme with user equipment (UE) sampling every instance of the transmitted signal, according to certain embodiments.

FIG. 7 illustrates an example NSSS transmit diversity scheme 50 with user equipment (UE) sampling every instance of the transmitted signal, according to certain embodiments. Specifically, according to certain embodiments, the network node configures the Narrowband Secondary Synchronization Signal (NSSS) transmit diversity scheme so that the wireless device will measure NRSRP across NSSS and NRS in an aligned manner.

In a first particular embodiment, the network informs the wireless device that the wireless device can perform NRSRP measurements on N subsequent NSSS subframes at a time, where N is an integer number. The wireless device may base the wireless device's estimate of NRSRP on M>N NSSS measurement occasions, but for each measurement occasion, N subsequent NSSS subframes are sampled.

In a second particular embodiment, the network informs the wireless device that the wireless device can perform NRSRP measurements on K NRS antenna ports, where K is an integer number. The wireless device may base its estimate of NRSRP on M>K measurement occasions, but tries to get an equal distribution of NRS measurements on K antenna ports over the M measurement occasions.

In a third particular embodiment, the wireless device can perform NRSRP measurements on a distinct set of NRS antenna ports, e.g. on antenna ports 2000 and/or 2001, based on indication from the network or according to the specification.

According to certain other embodiments, the wireless device is provided information to understand how the network node has configured the wireless device's NSSS transmit diversity scheme to allow the wireless device to measure NRSRP across NSSS and NRS in an aligned manner:

In a particular embodiment, for example, the network informs the wireless device about the configured transmit diversity scheme. Such information includes, but is not limited to, the number of NSSS antenna ports and the precoder matrix that defines the mapping from the NSSS antenna ports to the physical antenna ports.

A third set of embodiments describe the implementation of the signaling:

In a first particular embodiment, the signaling information is broadcasted in a master information block or system information block.

If the signaling is provided in a system information block, it may be included in one or more of SIB3-NB (serving cell, common intra-frequency neighbors, common inter-frequency neighbors), SIB4-NB (cell specific intra-frequency neighbors) and SIB5-NB (cell specific inter-frequency neighbors)

In a second particular embodiment, the signaling information is sent as part of a paging message information block or as part of the Direct Indication.

In a third particular embodiment, the signaling information is conveyed in a dedicated radio resource configuration (RRC) information element (IE) or a layer-1 control message.

In a particular embodiment, the RRC IE may be included in the RRC release message.

In a particular embodiment, the RRC IE may be part of the PhysicalConfigDedicated-NB-r13 IE in the RadioResourceConfigDedicated-NB message In a particular embodiment, the RRC IE may be part of the MeasConfig message In a particular embodiment, the layer-1 control message may be included in DL SCH using one of the unused LCID space.

In a particular embodiment, the layer-1 control message may be included in DL SCH by reinterpreting one of the used LCID space.

In a fourth particular embodiment, the network implicitly signals the number of NRS ports through different CRC masking, e.g. mask n applied to CRC indicates that there are n NRS ports. The wireless device may try all of the different masks and see which one results in a correct CRC. If mask n results in a correct CRC, the wireless device may perform continuous NRSRP measurements on N subsequent NSSS subframes.

In a fifth particular embodiment the setting may be explicitly specified in the specification. That is, for example, the number of NSSS antenna ports, the precoder matrix that defines the mapping from the NSSS antenna ports to the physical antenna ports, and other information may be explicitly specified in the specification. The network may only indicate whether the NSSS can be used for measurement in a cell. If the network indicates so, the wireless device follows the specified behavior in the specification.

NSSS is used as an example for performing the techniques described herein since NSSS is cell specific and, thus, is suitable for obtaining cell-specific RRM measurements. In general, however, the techniques may be applied to any cell-specific synchronization or reference signals. For example, if an additional cell-specific synchronization signal, such as a resynchronization signal (RSS), is available, it can be used for obtaining cell-specific RRM measurements.

Figure 8:
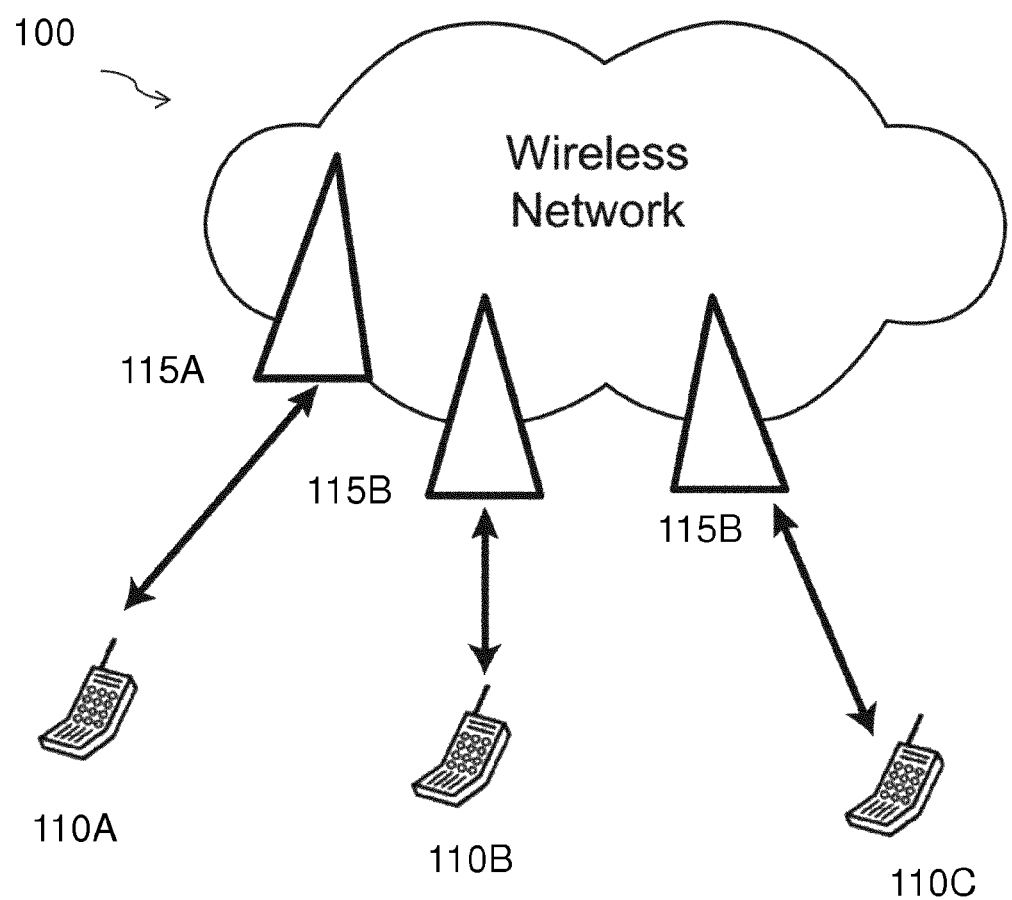
FIG. 8 illustrates an example network, according to certain embodiments.

FIG. 8 is a block diagram illustrating an embodiment of a network 100 for explicit measurement definition, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 8). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 110, network nodes 115, and other network nodes (such as radio network controller or core network node) are described in more detail with respect to FIGS. 9, 12, and 15, respectively.

Although FIG. 8 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE)

network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques for explicit measurement definition described herein are applicable to both LAA LTE and standalone LTE operation in license-exempt channels. The described techniques are generally applicable for transmissions from both network nodes 115 and wireless devices 110.

Figure 9:
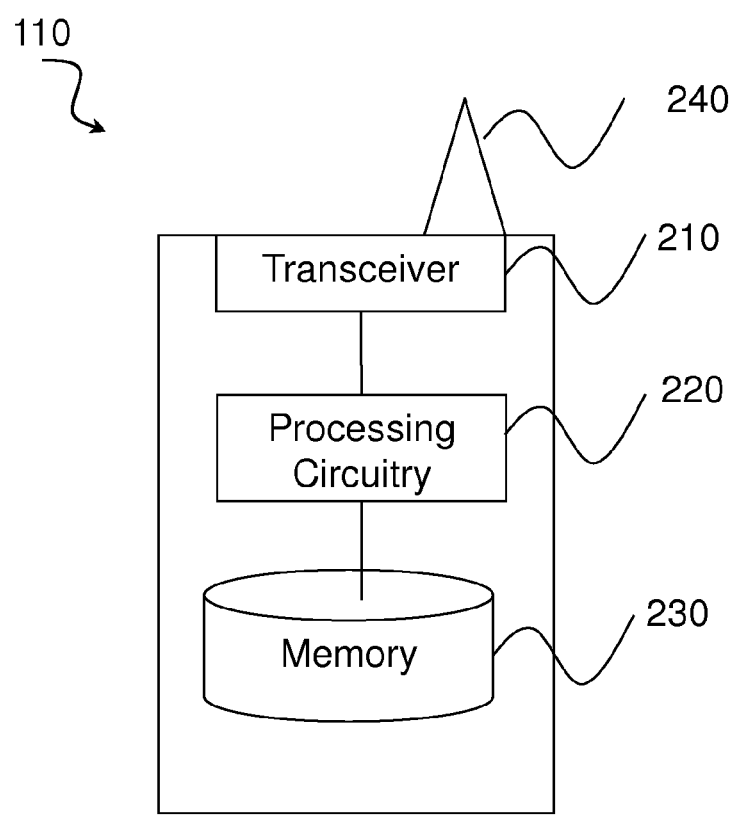
FIG. 9 illustrates an example wireless device, according to certain embodiments.

FIG. 9 is a block schematic of an exemplary wireless device 110 for explicit measurement definition, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 210, processing circuitry 220, and memory 230. In some embodiments, transceiver 210 facilitates transmitting wireless signals to and receiving wireless signals from network node 115 (e.g., via antenna 240), processing circuitry 220 (e.g., which may include one or more processors) executes instructions to provide some or all of the functionality described above as being provided by wireless device 110, and memory 230 stores the instructions executed by processing circuitry 220.

Processing circuitry 220 may include any suitable combination of hardware and software implemented in one or more modules to execute instructions and manipulate data to perform some or all of the described functions of wireless device 110, such as the functions of UE 110 (i.e., wireless device 110) described herein. According to certain embodiments, for example, processing circuitry 220 may receive information relating to a NSSS transmit diversity scheme and, based on the NSSS transmit diversity scheme, perform at least one measurement across NSSS and NRS in an aligned manner. In some embodiments, processing circuitry 220 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 220.

Other embodiments of wireless device 110 may optionally include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 220. Input devices include mechanisms for entry of data into wireless device 110. For example, input devices may include input mechanisms, such as a microphone, input elements, a display, etc. Output devices may include mechanisms for outputting data in audio, video, and/or hard copy format. For example, output devices may include a speaker, a display, etc.

Figure 10:
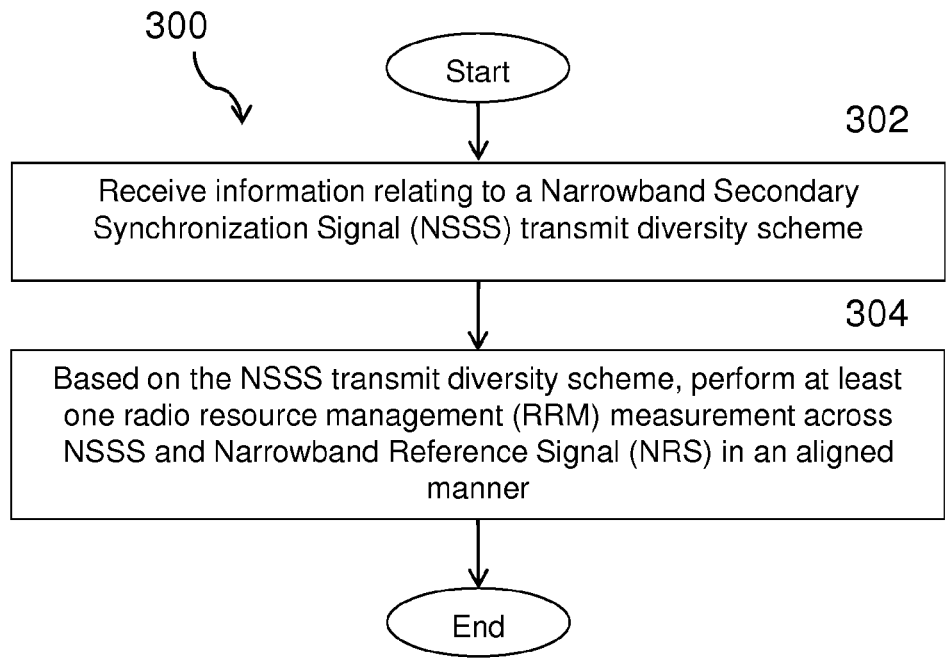
FIG. 10 illustrates an example method by a wireless device, according to certain embodiments.

FIG. 10 illustrates an example method 300 for explicit measurement definition, according to certain embodiments. The method begins at step 302 when wireless device 110 receives information relating to a NSSS transmit diversity scheme. In a particular embodiment, the NSSS transmit delivery scheme may include a number of NSSS antenna ports and a precoder that defines a precoder matrix, which defines a mapping from the NSSS antenna ports to physical antenna ports.

At step 304, wireless device 110 performs, based on the NSSS transmit diversity scheme, at least one RRM measurement across NSSS and NRS in an aligned manner. According to certain embodiments, the at least one RRM measurement may include at least one Narrowband Signal Received Power (NRSRP) measurement, at least one Reference Signal Received Power (RSRP) measurement, at least one Received Signal Strength Indicator (RSSI) measurement, and/or at least one Reference Signal Received Quality (RSRQ) measurement.

In a particular embodiment, the at least one RRM measurement may be performed on N subsequent NSSS subframes at a time, where N is an integer number. For example, the at least one RRM measurement may include estimating the at least one RRM measurement on M>N NSSS measurement occasions, but for each measurement occasion, N subsequent NSSS subframes are sampled.

In a particular embodiment, the at least one RRM measurement may be performed on K NRS antenna ports, where K is an integer number. For example, performing the at least one RRM measurement may include estimating the at least one RRM measurement on M>K measurement occasions, while trying to get an equal distribution of NRS measurements on K antenna ports over the M measurement occasions.

According to certain embodiments, the at least one RRM measurement may be performed on a distinct set of NRS antenna ports. In a particular embodiment, the distinct set of NRS antenna ports may be received from the network node. In other embodiments, the distinct set of NRS antenna ports may be determined based on a specification.

According to a particular embodiment, the NSSS transmit diversity scheme may be received in a master information block or system information block. In another embodiment, the NSSS transmit diversity scheme may be received as part of a paging message information block or as part of the Direct Indication. In still another embodiment, the NSSS transmit diversity scheme may be received in a dedicated radio resource configuration (RRC) information element (IE) or a layer-1 control message. For example, the RRC IE may be included in the RRC release message, may be part of the PhysicalConfigDedicated-NB-r13 IE in the RadioResourceConfigDedicated-NB message, or may be part of the MeasConfig message. In other embodiments, the layer-1 control message may be included in DL SCH using one of the unused LCID space or by reinterpreting one of the used LCID space.

According to certain embodiments, the NSSS transmit diversity scheme may identify a number of NRS ports through different CRC masking, where a mask n applied to CRC indicates that there are n NRS ports. The wireless device 110 may then try each of the plurality of CRC masks, determine a particular one of the plurality of CRC masks results in a correct CRC, and perform continuous NRSRP measurements on N subsequent NSSS subframes.

According to certain other embodiments, the NSSS transmit diversity scheme may identify whether NSSS can be used for measurement in a cell. Wireless device 110 may then determine a number of NSSS antenna ports, the precoder matrix that defines the mapping from the NSSS antenna ports to the physical antenna ports, and other information based on a specification.

Aspects of the disclosure provide a wireless device configured to receive information relating to a NSSS transmit diversity scheme. The information indicates a number of NSSS occasions that use different NSSS transmit diversity configurations. The information of the number of occasions may be provided by a value of a parameter transmitted to the wireless device by RRC. The received indication is for use in performing at least one measurement to be performed across NSSS occasions. In some aspects, the indication indicates a set of NSSS occasions in which each NSSS occasion uses a unique transmit diversity scheme, i.e. precoder. In some aspects, the received information indicates a number of consecutive NSSS occasions that use different NSSS transmit diversity configurations. As such, the wireless device is informed by the network of how many NSSS occasions use a different (i.e. unique) NSSS transmit diversity configuration or precoder. In some aspects, the wireless device uses the received indication to perform at least one measurement across the NSSS occasions. In some aspects, the wireless device with the received information can perform measurements over a number of NSSS occasions, the number of NSSS occasions based on (for example, equal to) the received indication of the number of NSSS occasions using different precoders/transmit diversity configuration. In some aspects, the received indication indicates a number of consecutive NSSS occasions that use different precoders for NSSS transmission. In some aspects, the received information provides a configuration for NSSS-based RRM measurements. As such, measurement by the wireless device is improved. Aspects of the disclosure also provide for transmitting by a network node of the indication which indicates a number of NSSS occasions in which each NSSS occasion uses a unique transmit diversity scheme, i.e. precoder, as described in any example. The transmitting may be by transmitting of a value of a parameter using RRC.

Certain embodiments may comprise more or fewer actions, and the actions may be performed in any suitable order.

Figure 11:
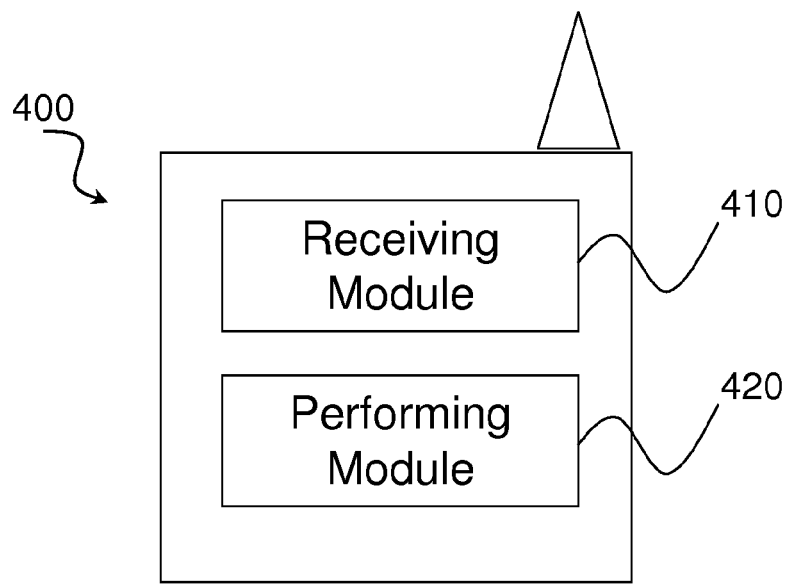
FIG. 11 illustrates an example virtual computing device, according to certain embodiments.

In certain embodiments, the method for explicit measurement definition may be performed by a virtual computing device. FIG. 11 illustrates an example virtual computing device 400 for explicit measurement definition, according to certain embodiments. In certain embodiments, virtual computing device 400 may include modules for performing steps similar to those described above with regard to the method illustrated and described in FIG. 10. For example, virtual computing device 400 may include receiving module 410, a performing module 420, and any other suitable modules for explicit measurement definition. In some embodiments, one or more of the modules may be implemented using processing circuitry 220 of FIG. 9. In certain embodiments, the functions of two or more of the various modules may be combined into a single module.

The receiving module 410 may perform certain of the receiving functions of virtual computing device 400. For example, in a particular embodiment, receiving module 410 may receive information relating to a NSSS transmit diversity scheme. For example, the information may include a number of NSSS antenna ports and a precoder that defines a precoder matrix, which defines a mapping from the NSSS antenna ports to physical antenna ports.

The performing module 420 may perform certain of the performing functions of virtual computing device 400. For example, in a particular embodiment, performing module 420 may perform, based on the NSSS transmit diversity scheme, at least one radio resource management (RRM) measurement across NSSS and Narrowband Reference Signal (NRS) in an aligned manner Other embodiments of virtual computing device 400 may include additional components beyond those shown in FIG. 11 that may be responsible for providing certain aspects of the wireless device's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 12:
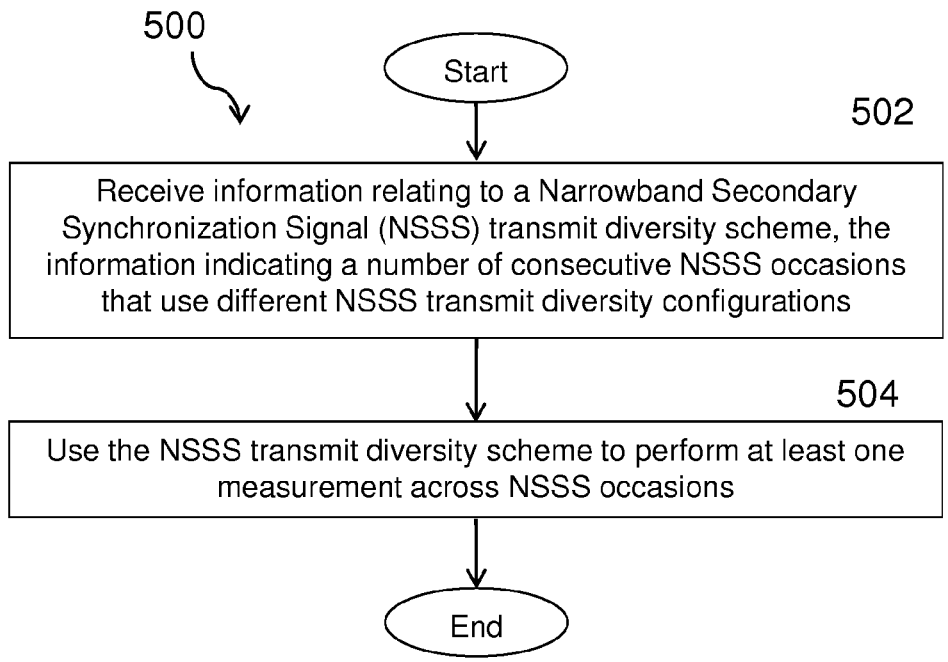
FIG. 12 illustrates another example method by a wireless device, according to certain embodiments.

FIG. 12 illustrates another example method 500 by wireless device 110, according to certain embodiments. The method begins at step 502 when wireless device 110 receives information relating to a NSSS transmit diversity scheme The information indicates a number of NSSS occasions that use different NSSS transmit diversity configurations. In a particular embodiment, each NSSS occasion may include a subframe.

In a particular embodiment, the information related to the NSSS transmit diversity scheme is received in a master information block or system information block.

In another particular embodiment, the information related to the NSSS transmit diversity scheme is received as part of a paging message information block or as part of the Direct Indication.

In still another particular embodiment, the information related to the NSSS transmit diversity scheme is received in a dedicated RRC information element (IE) or a layer-1 control message.

At step 504, wireless device 110 uses the NSSS transmit diversity scheme to perform at least one measurement across NSSS occasions. In a particular embodiment, the at least one measurement may be one or more of a NRSRP measurement, a RSRP measurement, a RSSI measurement, and a RSRQ measurement.

In a particular embodiment, for example, when performing the at least one measurement, wireless device 110 may perform the at least one measurement on a number, N, of consecutive NSSS occasions at a time, and N is an integer number. For example, the at least one measurement may be estimated during the number, M, of measurement occasions, by sampling a number, N, of consecutive NSSS subframes during each measurement occasion. In a particular embodiment M may be greater than N. In another embodiment, N may be any integer greater than or equal to 1.

In a particular embodiment, when performing the at least one measurement, wireless device 110 may determine determining an average over the number, N, of consecutive NSSS occasions.

In a particular embodiment, when performing the at least one measurement, wireless device 110 may include determining that an average of the at least one measurement over a number of consecutive subframes that is less than N meets a threshold level of accuracy and ceasing to perform the at least one measurement over at least one consecutive subframe.

In a particular embodiment, the NSSS transmit delivery scheme may include a number, L, of NSSS antenna ports and some precoder matrix that indicates a mapping from each NSSS antenna port to a physical antenna port. For example, wireless device 110 may choose a subset of antenna ports in each of the M occasions, in a particular embodiment. Wireless device 110 may average the measurements for the subset of antenna ports across the M occasions.

In a particular embodiment, when performing the at least one measurement, wireless device 110 performs the at least one measurement on a number, K, of NRS antenna ports where K is an integer number.

In a particular embodiment, when performing the at least one measurement, wireless device 110 estimates the at least one measurement on a number of measurement occasions, M, while trying to get an equal distribution of NRS measurements on the number, K, of NRS antenna ports over the M measurement occasions. In a particular embodiment, M may be greater than K. In another embodiment, M may be equal to K.

In a particular embodiment, wireless device 110 may sample measurements on the subset of antenna ports and perform early termination of the measurements when a threshold is reached.

Certain embodiments may comprise more or fewer actions, and the actions may be performed in any suitable order.

Figure 13:
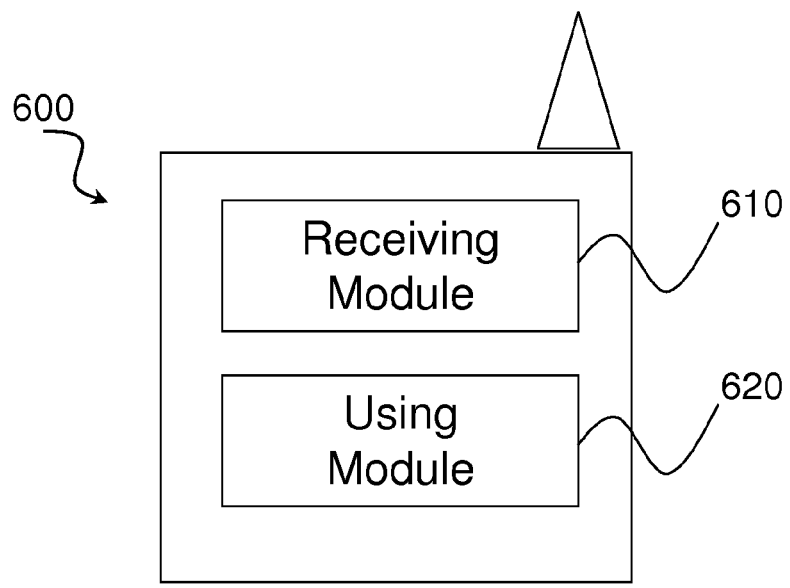
FIG. 13 illustrates another example virtual computing device, according to certain embodiments.

In certain embodiments, the method may be performed by a virtual computing device. FIG. 13 illustrates another example virtual computing device 600, according to certain embodiments. In certain embodiments, virtual computing device 600 may include modules for performing steps similar to those described above with regard to the method illustrated and described in FIG. 12. For example, virtual computing device 600 may include receiving module 610, a using module 620, and any other suitable modules. In some embodiments, one or more of the modules may be implemented using processing circuitry 220 of FIG. 9. In certain embodiments, the functions of two or more of the various modules may be combined into a single module.

The receiving module 6410 may perform certain of the receiving functions of virtual computing device 600. For example, in a particular embodiment, receiving module 610 may receive information relating to a NSSS transmit diversity scheme The information indicates a number of NSSS occasions that use different NSSS transmit diversity configurations.

The using module 620 may perform certain of the using functions of virtual computing device 600. For example, in a particular embodiment, using module 620 may use the NSSS transmit diversity scheme to perform at least one measurement across NSSS occasions.

Other embodiments of virtual computing device 600 may include additional components beyond those shown in FIG. 13 that may be responsible for providing certain aspects of the wireless device's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 14:
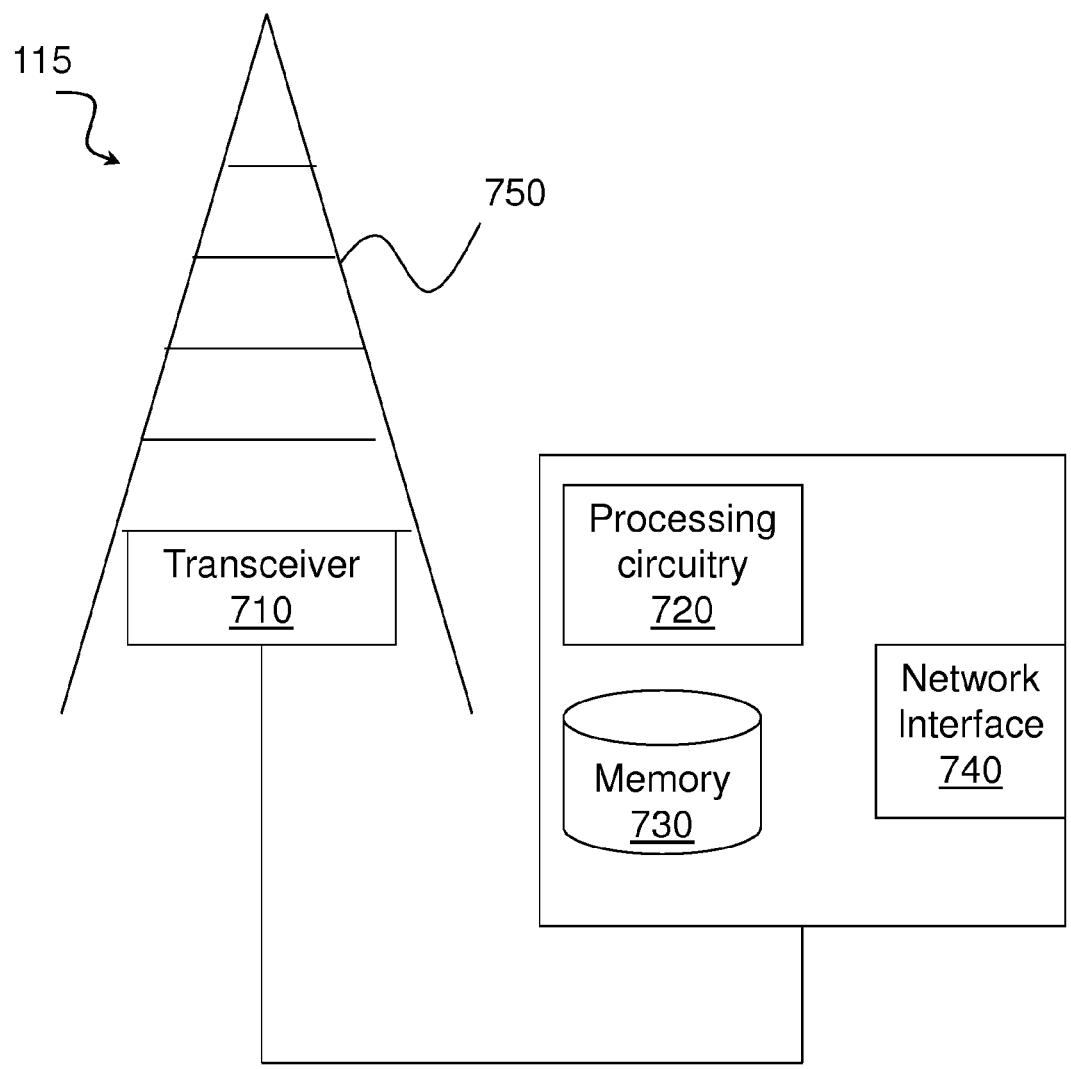
FIG. 14 illustrates an example network node, according to certain embodiments.

FIG. 14 illustrates an example network node 115 for explicit measurement definition, in accordance with certain embodiments. Network node 115 may be any type of radio network node or any network node that communicates with a UE and/or with another network node. Examples of network node 115 include an gNB, eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processing circuitry 720 (e.g., which may include one or more processors), memory 530, and network interface 740. In some embodiments, transceiver 510 facilitates transmitting wireless signals to and receiving wireless signals from wireless device 110 (e.g., via antenna 750), processing circuitry 720 executes instructions to provide some or all of the functionality described above as being provided by a network node 115, memory 730 stores the instructions executed by processing circuitry 720, and network interface 740 communicates signals to backend network components, such as a gateway, switch, router, Internet, Public Switched Telephone Network (PSTN), core network nodes or radio network controllers, etc.

Processing circuitry 720 may include any suitable combination of hardware and software implemented in one or more modules to execute instructions and manipulate data to perform some or all of the described functions of network node 115, such as those described herein. In a particular embodiment, for example, processing circuitry 720 may transmit, to a wireless device, a Narrowband Secondary Synchronization Signal (NSSS) transmit diversity scheme for performing at least one radio resource management (RRM) measurement across NSSS and Narrowband Reference Signal (NRS) in an aligned manner. In some embodiments, processing circuitry 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 14 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 15:
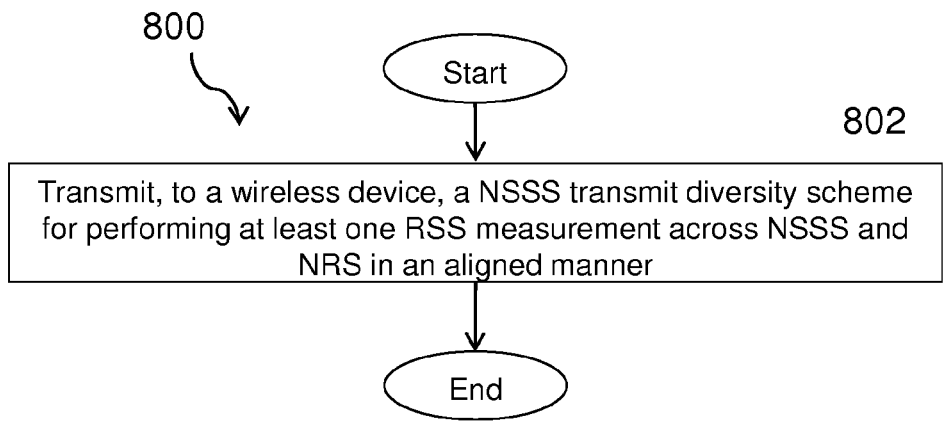
FIG. 15 illustrates an example method by a network node, according to certain embodiments.

FIG. 15 illustrates an example method 800 by a network node 115 for explicit measurement definition, according to certain embodiments. The method begins at step 802 when network node 115 transmits, to a wireless device, a NSSS transmit diversity scheme for performing at least one RRM measurement across NSSS and NRS in an aligned manner. According to various particular embodiments, the at least one RRM measurement may include at least one NRSRP measurement, at least one RSRP measurement, at least one RSSI measurement, and/or at least one RSRQ measurement.

In a particular embodiment, the NSSS transmit delivery scheme may include a number of NSSS antenna ports and a precoder that defines a precoder matrix, which defines a mapping from the NSSS antenna ports to physical antenna ports. In another embodiment, the NSSS transmit diversity scheme configures the wireless device to perform the at least one RRM measurement to be performed on N subsequent NSSS subframes at a time, where N is an integer number. For example, the NSSS transmit diversity scheme may configure the wireless device to estimate the at least one RRM measurement on M>N NSSS measurement occasions, but for each measurement occasion, N subsequent NSSS subframes are sampled.

In yet another embodiment, the NSSS transmit diversity scheme may configure the wireless device to perform the at least one RRM measurement on K NRS antenna ports, where K is an integer number. For example, the wireless device may be configured to estimate the at least one RRM measurement on M>K measurement occasions, while trying to get an equal distribution of NRS measurements on K antenna ports over the M measurement occasions.

According to certain other embodiments, the NSSS transmit diversity scheme may configure the wireless device to perform the at least one RRM measurement on a distinct set of NRS antenna ports. In a particular embodiment, the network node 115 transmits the distinct set of NRS antenna ports to the wireless device. In another embodiment, the distinct set of NRS antenna ports may be determined based on a specification.

According to certain embodiments, the NSSS transmit diversity scheme may be broadcasted in a master information block or system information block. In other embodiments, the NSSS transmit diversity scheme may be transmitted as part of a paging message information block or as part of the Direct Indication. In still other embodiments, the NSSS transmit diversity scheme may be transmitted in a dedicated RRC IE or a layer-1 control message. For example, the RRC IE may be included in the RRC release message, as a part of the PhysicalConfigDedicated-NB-r13 IE in the RadioResourceConfigDedicated-NB message, or as a part of the MeasConfig message. In other example embodiments, the layer-1 control message may be included in DL SCH using one of the unused LCID space or in DL SCH by reinterpreting one of the used LCID space.

According to certain embodiments, the NSSS transmit diversity scheme may identify a number of NRS ports through different CRC masking, wherein a mask n applied to CRC indicates that there are n NRS ports. In still other embodiments, the NSSS transmit diversity scheme may identify whether NSSS can be used for measurement in a cell, and the wireless device may determine a number of NSSS antenna ports, the precoder matrix that defines the mapping from the NSSS antenna ports to the physical antenna ports, and other information based on a specification.

Certain embodiments may comprise more or fewer actions, and the actions may be performed in any suitable order.

Figure 16:
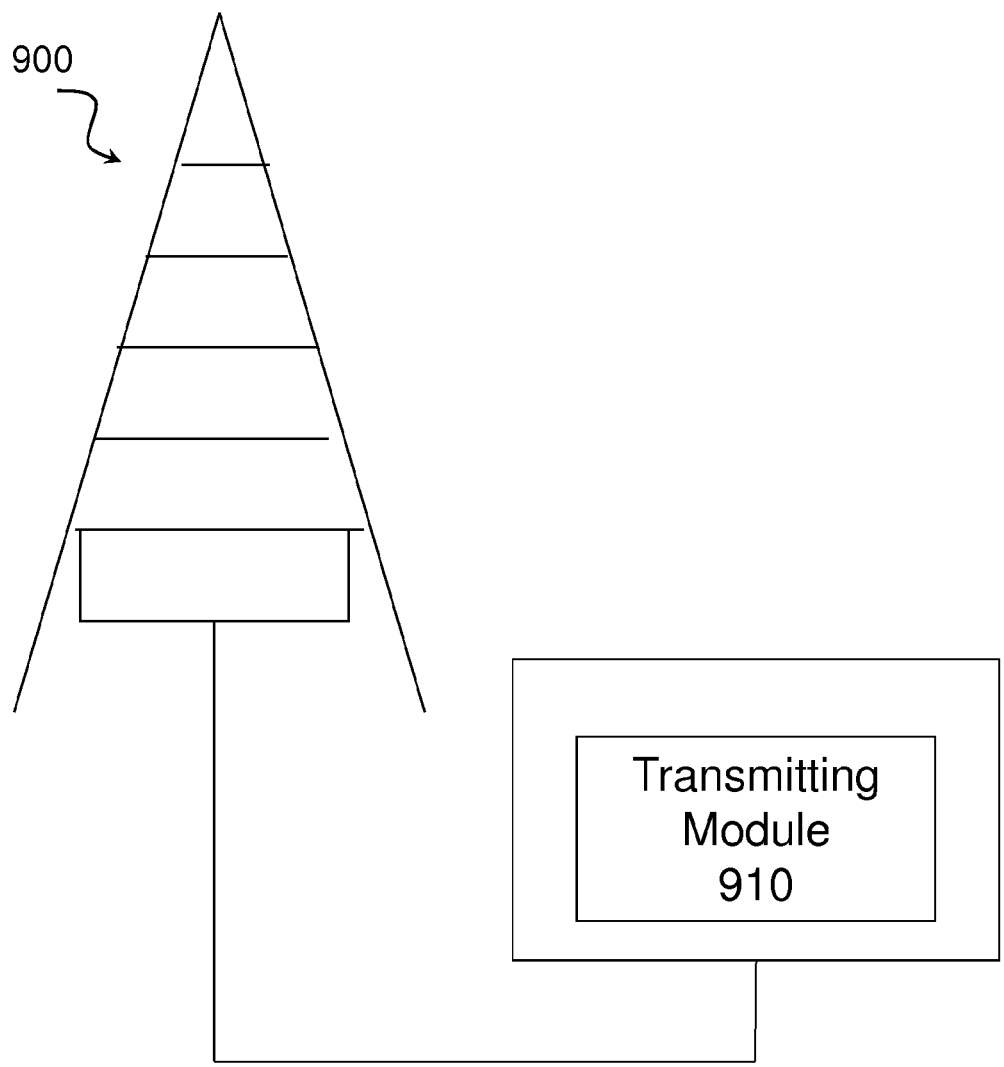
FIG. 16 illustrates another example virtual computing device, according to certain embodiments.

In certain embodiments, the method for explicit measurement definition may be performed by a virtual computing device. FIG. 16 illustrates another example virtual computing device 900 for explicit measurement definition, according to certain embodiments. In certain embodiments, virtual computing device 900 may include modules for performing steps similar to those described above with regard to the method illustrated and described in FIG. 15. For example, virtual computing device 900 may include a transmitting module 910 and any other suitable modules for explicit measurement definition. In some embodiments, one or more of the modules may be implemented using processing circuitry 720 of FIG. 14. In certain embodiments, the functions of two or more of the various modules may be combined into a single module.

The transmitting module 910 may perform certain of the transmitting functions of virtual computing device 900. For example, in a particular embodiment, transmitting module 910 may transmits, to a wireless device, a NSSS transmit diversity scheme for performing at least one RRM measurement across NSSS and NRS in an aligned manner.

Other embodiments of virtual computing device 1100 may include additional components beyond those shown in FIG. 16 that may be responsible for providing certain aspects of the network node's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 17:
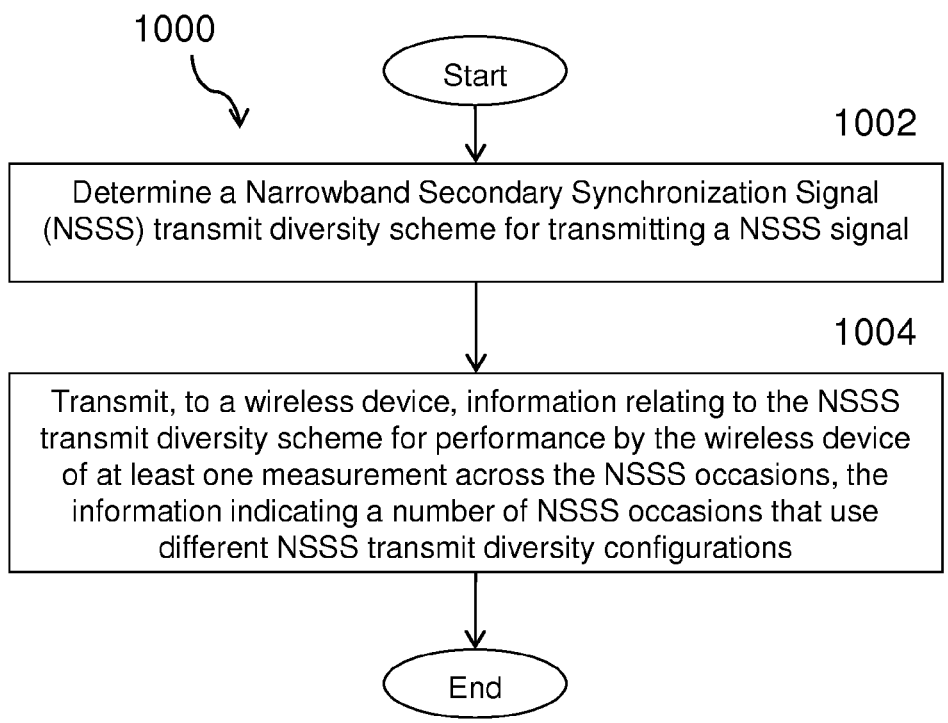
FIG. 17 illustrates an example method by a network node, according to certain embodiments.

FIG. 17 illustrates another example method 1000 by a network node 115, according to certain embodiments. The method begins at step 1002 when network node 115 determines a NSSS transmit diversity scheme for transmitting a NSSS signal.

At step 1004, network node 115 transmits, to a wireless device 110, information relating to the NSSS transmit diversity scheme for performance by the wireless device 110 of at least one measurement across NSSS occasions. The information indicates a number of NSSS occasions that use different NSSS transmit diversity configurations. In a particular embodiment, each NSSS occasion is a subframe.

In a particular embodiment, when determining the NSSS transmit diversity scheme, network node 115 determines a number, L, of NSSS antenna ports for transmitting the NSSS to the wireless device. For example, in a particular embodiment, the NSSS transmit delivery scheme may include the number, K, of NSSS antenna ports and some precoder matrix that indicates a mapping from each of the number, K, of NSSS antenna ports to a physical antenna port.

In a particular embodiment, the method may further include network node 115 transmitting a distinct set of NRS antenna ports to wireless device 110. In a particular embodiment, the distinct set of NRS antenna ports may be based on a specification.

In a particular embodiment, when transmitting the information relating to the NSSS transmit diversity scheme, network node 115 may broadcast the information in a master information block or system information block.

In a particular embodiment, when transmitting the information relating to the NSSS transmit diversity scheme, network node 115 transmits the information as part of a paging message information block or as part of the Direct Indication.

In still another particular embodiment, when transmitting the information relating to the NSSS transmit diversity scheme, network node 115 transmits the information in a dedicated RRC IE or a layer-1 control message.

In a particular embodiment, the measurement may be at least one of a NRSRP measurement, a RSRP measurement, a RSSI measurement, and a RSRQ measurement.

Certain embodiments may comprise more or fewer actions, and the actions may be performed in any suitable order.

Figure 18:
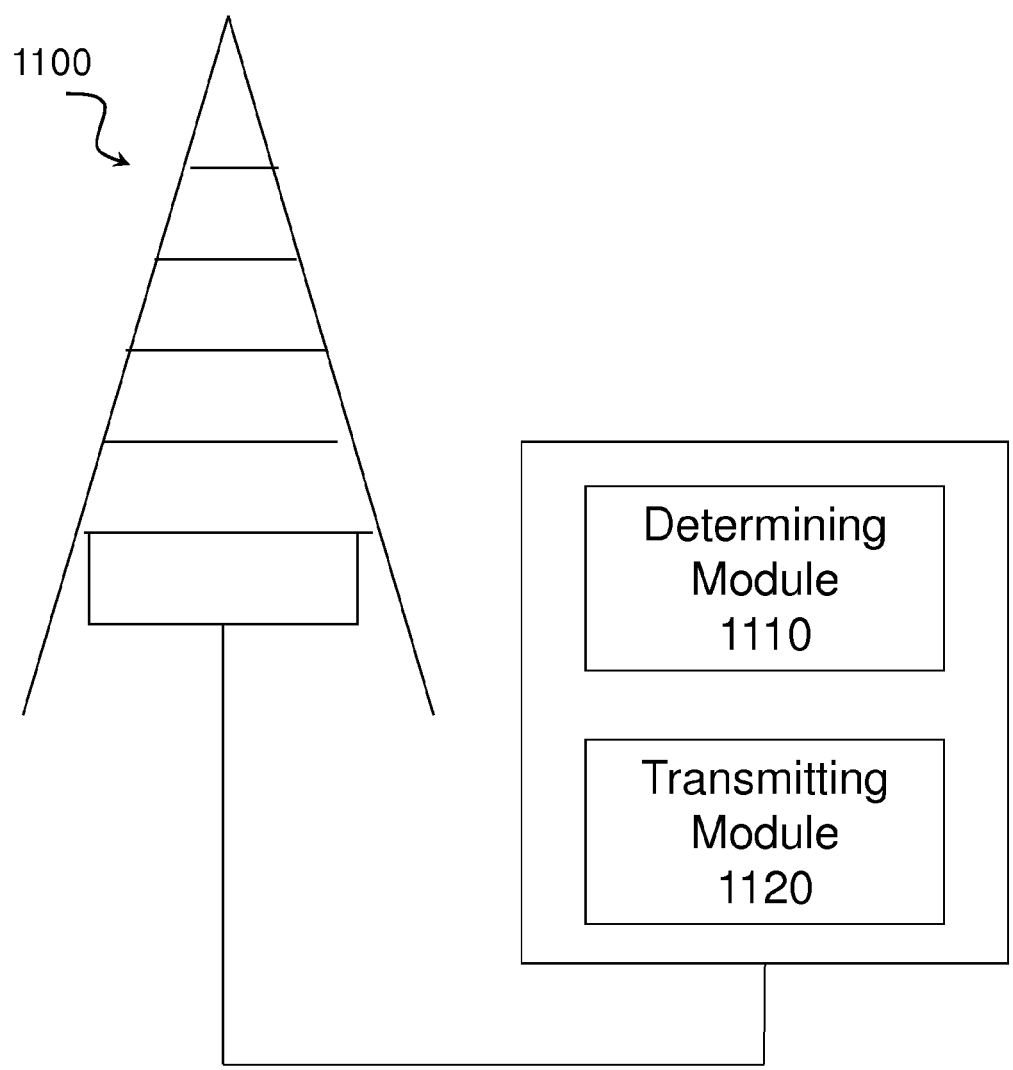
FIG. 18 illustrates another example virtual computing device, according to certain embodiments.

In certain embodiments, the method for explicit measurement definition may be performed by a virtual computing device. FIG. 18 illustrates another example virtual computing device 1100, according to certain embodiments. In certain embodiments, virtual computing device 1100 may include modules for performing steps similar to those described above with regard to the method illustrated and described in FIG. 17. For example, virtual computing device 1100 may include a determining module 1110, a transmitting module 1120, and any other suitable modules. In some embodiments, one or more of the modules may be implemented using processing circuitry 720 of FIG. 14. In certain embodiments, the functions of two or more of the various modules may be combined into a single module.

The determining module 1110 may perform certain of the determining functions of virtual computing device 1100. For example, in a particular embodiment, determining module 1110 may determine a NSSS transmit diversity scheme for transmitting a NSSS signal.

The transmitting module 1110 may perform certain of the transmitting functions of virtual computing device 1100. For example, in a particular embodiment, transmitting module 1110 may transmit, to a wireless device 110, information relating to the NSSS transmit diversity scheme for performance by the wireless device 110 of at least one measurement across NSSS occasions. The information indicates a number of NSSS occasions that use different NSSS transmit diversity configurations.

Other embodiments of virtual computing device 1100 may include additional components beyond those shown in FIG. 18 that may be responsible for providing certain aspects of the network node's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 19:
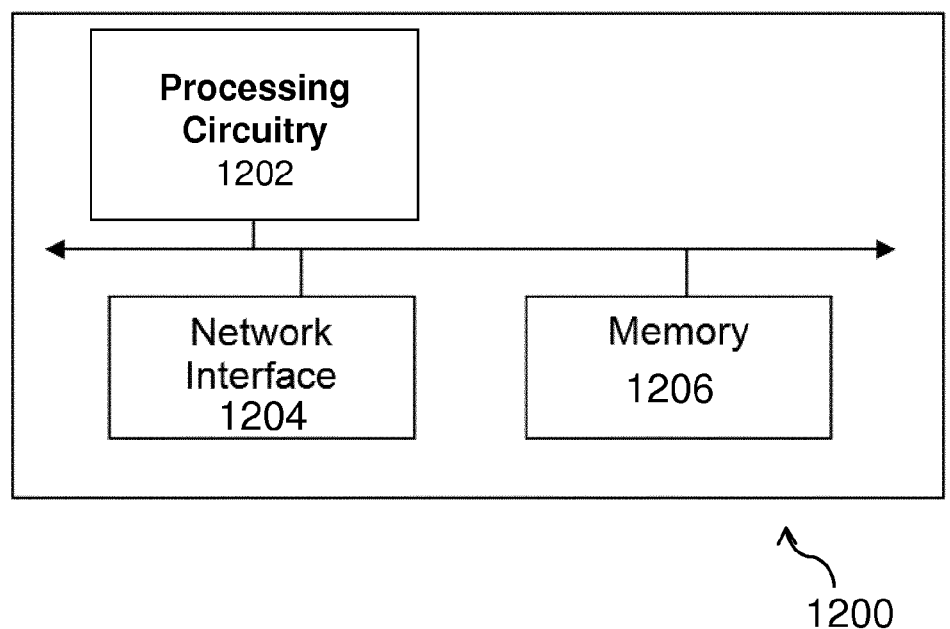
FIG. 19 illustrates an exemplary radio network controller or core network node, according to certain embodiments.

FIG. 19 illustrates an example radio network controller or core network node 1200, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 1202 (e.g., which may include one or more processors), network interface 1204, and memory 1206. In some embodiments, processing circuitry 1202 executes instructions to provide some or all of the functionality described above as being provided by the network node, memory 1206 stores the instructions executed by processing circuitry 1202, and network interface 1204 communicates signals to any suitable node, such as a gateway, switch, router, Internet, Public Switched Telephone Network (PSTN), network nodes 115, radio network controllers or core network nodes, etc.

Processing circuitry 1202 may include any suitable combination of hardware and software implemented in one or more modules to execute instructions and manipulate data to perform some or all of the described functions of the radio network controller or core network node. In some embodiments, processing circuitry 1202 may include, for example, one or more computers, one or more central processing units (CPUs), one or more microprocessors, one or more applications, and/or other logic.

Memory 1206 is generally operable to store instructions, such as a computer program, software, an application including one or more of logic, rules, algorithms, code, tables, etc. and/or other instructions capable of being executed by a processor. Examples of memory 1206 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1204 is communicatively coupled to processing circuitry 1202 and may refer to any suitable device operable to receive input for the network node, send output from the network node, perform suitable processing of the input or output or both, communicate to other devices, or any combination of the preceding. Network interface 1204 may include appropriate hardware (e.g., port, modem, network interface card, etc.) and software, including protocol conversion and data processing capabilities, to communicate through a network.

Other embodiments of the network node may include additional components beyond those shown in FIG. 19 that may be responsible for providing certain aspects of the network node's functionality, including any of the functionality described above and/or any additional functionality (including any functionality necessary to support the solution described above).

Figure 20:
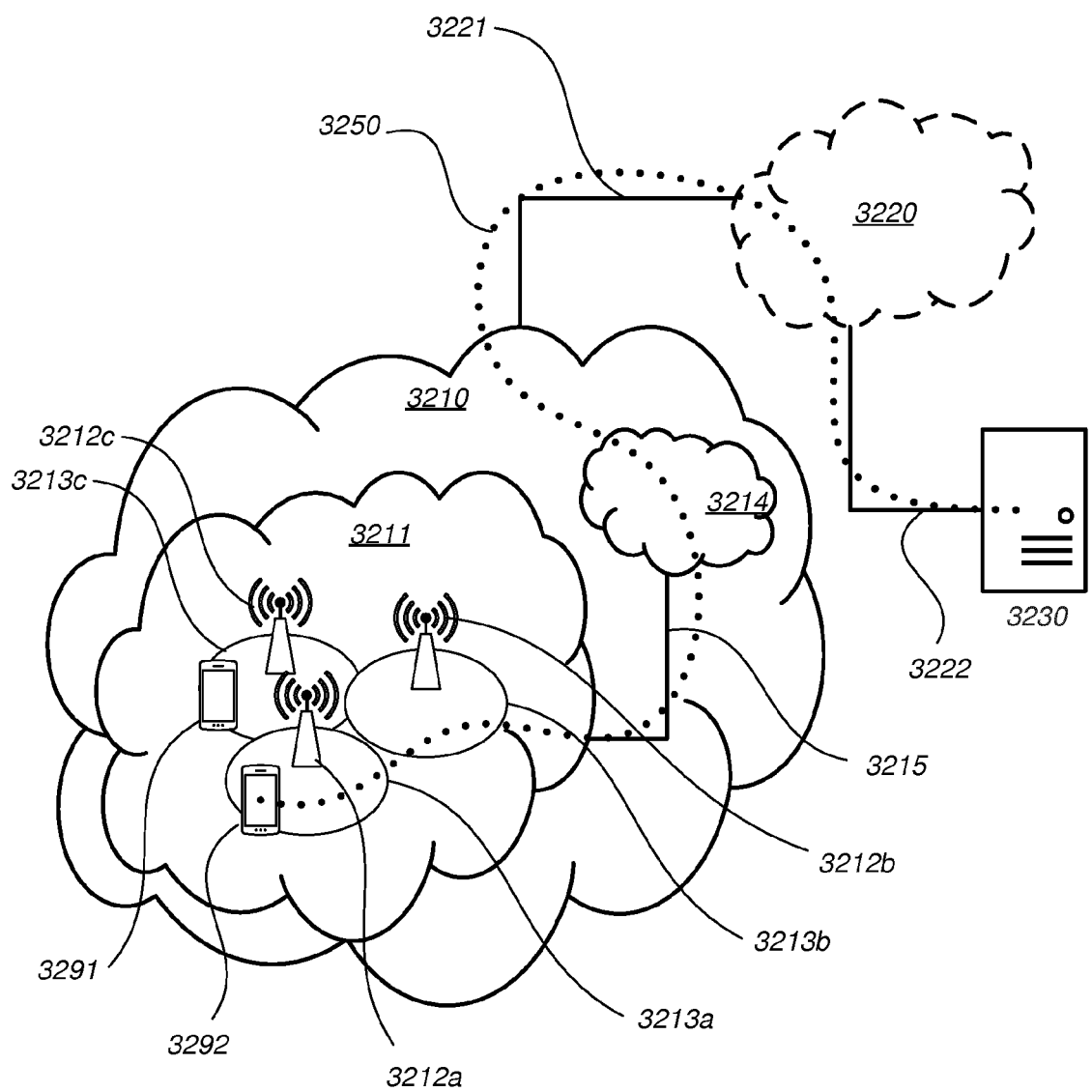
FIG. 20 illustrates a telecommunication network connected via an intermediate network to a host computer, according to certain embodiments.

FIG. 20 schematically illustrates a telecommunication network connected via an intermediate network to a host computer, according to certain embodiments. In accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 20 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Figure 21:
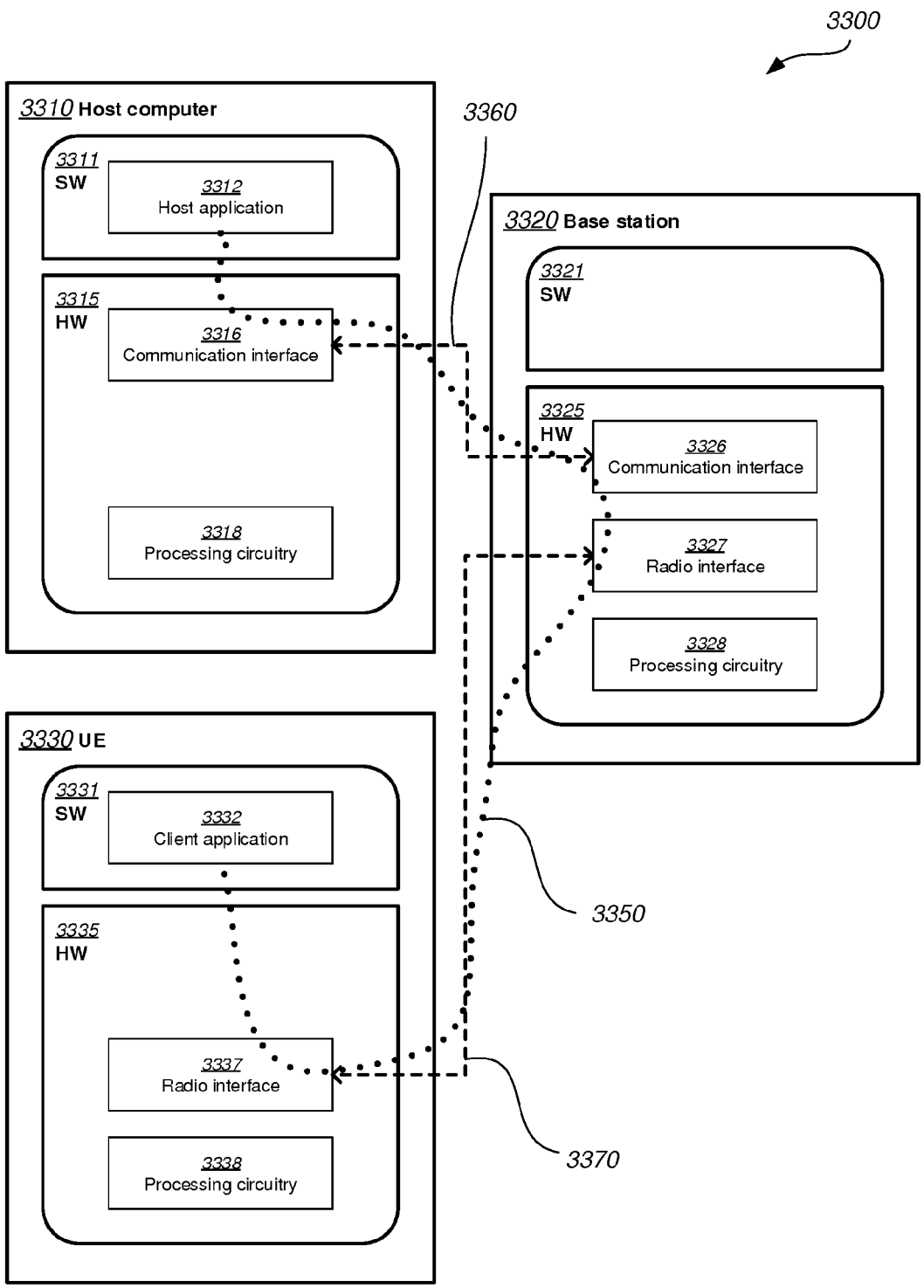
FIG. 21 illustrates a generalized block diagram of a host computer communicating via a base station with a user equipment over a partially wireless connection, according to certain embodiments.

FIG. 21 is a generalized block diagram of a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 21. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 21) served by the base station 3320. The communication interface 3326 may be configured to facilitate a connection 3360 to the host computer 3310. The connection 3360 may be direct or it may pass through a core network (not shown in FIG. 21) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 21 may be identical to the host computer 3230, one of the base stations 3212a, 3212b, 3212c and one of the UEs 3291, 3292 of FIG. 20, respectively. This is to say, the inner workings of these entities may be as shown in FIG. 21 and independently, the surrounding network topology may be that of FIG. 20.

In FIG. 21, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and/or latency, and thereby provide benefits such as reduced user waiting time, relaxed restriction on file size, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 22:
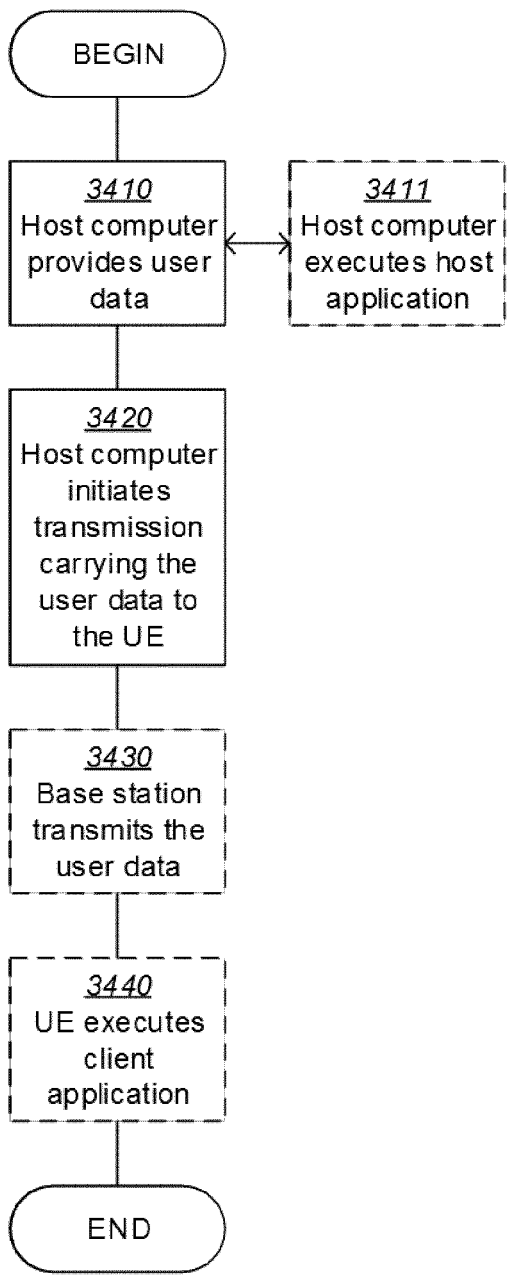
FIG. 22 illustrates a method implemented in a communication system, according to one embodiment.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 23:
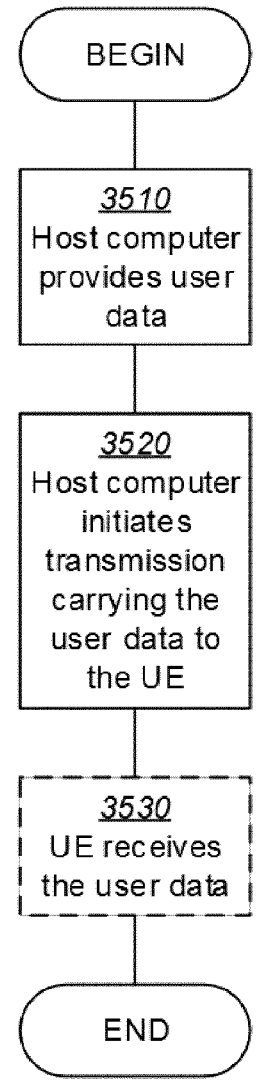
FIG. 23 illustrates another method implemented in a communication system, according to one embodiment.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Example Embodiments

Embodiment 1. A network node for explicit measurement definition, the network node comprising:
  memory operable to store instructions; and
  processing circuitry operable to execute the instructions to cause the network node to:
    transmit, to a wireless device, a Narrowband Secondary Synchronization Signal (NSSS) transmit diversity scheme for performing at least one radio resource management (RRM) measurement across NSSS and Narrowband Reference Signal (NRS) in an aligned manner.

Embodiment 2. The network node of embodiment 1, wherein the NSSS transmit delivery scheme comprises a number of NSSS antenna ports and a precoder matrix that defines a mapping from the NSSS antenna ports to physical antenna ports.

Embodiment 3. The network node of embodiment 1, wherein the NSSS transmit diversity scheme configures the wireless device to perform the at least one RRM measurement to be performed on N subsequent NSSS subframes at a time, where N is an integer number.

Embodiment 4. The network node of embodiment 3, wherein the NSSS transmit diversity scheme configures the wireless device to estimate the at least one RRM measurement on M>N NSSS measurement occasions, but for each measurement occasion, N subsequent NSSS subframes are sampled.

Embodiment 5. The network node of embodiment 1, wherein the NSSS transmit diversity scheme configures the wireless device to perform the at least one RRM measurement on K NRS antenna ports, where K is an integer number.

Embodiment 6. The network node of embodiment 5, wherein the NSSS transmit diversity scheme configures the wireless device to estimate the at least one RRM measurement on M>K measurement occasions, while trying to get an equal distribution of NRS measurements on K antenna ports over the M measurement occasions.

Embodiment 7. The network node of embodiment 1, wherein the NSSS transmit diversity scheme configures the wireless device to perform the at least one RRM measurement on a distinct set of NRS antenna ports.

Embodiment 8. The network node of embodiment 7, wherein the processing circuitry is further operable to execute the instructions to cause the network node to transmit the distinct set of NRS antenna ports to the wireless device.

Embodiment 9. The network node of embodiment 7, wherein the distinct set of NRS antenna ports are based on a specification.

Embodiment 10. The network node of embodiments 1 to 9, wherein the NSSS transmit diversity scheme broadcasted in a master information block or system information block.

Embodiment 11. The network node of embodiments 1 to 9, wherein the NSSS transmit diversity scheme is transmitted as part of a paging message information block or as part of the Direct Indication.

Embodiment 12. The network node of embodiments 1 to 9, wherein the NSSS transmit diversity scheme is transmitted in a dedicated radio resource configuration (RRC) information element (IE) or a layer-1 control message.

Embodiment 13. The network node of embodiment 12, wherein:
the RRC IE may be included in the RRC release message;
the RRC IE may be part of the PhysicalConfigDedicated-NB-r13 IE in the RadioResourceConfigDedicated-NB message; or
the RRC IE may be part of the MeasConfig message.

Embodiment 14. The network node of embodiment 12, wherein:
the layer-1 control message may be included in DL SCH using one of the unused LCID space; or
the layer-1 control message may be included in DL SCH by reinterpreting one of the used LCID space.

Embodiment 15. The network node of embodiments 1 to 14, wherein the NSSS transmit diversity scheme identifies a number of NRS ports through different CRC masking, wherein a mask n applied to CRC indicates that there are n NRS ports.

Embodiment 16. The network node of embodiments 1 to 15, wherein:
the NSSS transmit diversity scheme identifies whether NSSS can be used for measurement in a cell, and the wireless device may determine a number of NSSS antenna ports, the precoder matrix that defines the mapping from the NSSS antenna ports to the physical antenna ports, and other information based on a specification.

Embodiment 17. The network node of embodiments 1 to 16, wherein the at least one RRM measurement comprises:
at least one Narrowband Signal Received Power (NRSRP) measurement;
at least one Reference Signal Received Power (RSRP) measurement;
at least one Received Signal Strength Indicator (RSSI) measurement; or
at least one Reference Signal Received Quality (RSRQ) measurement.

Embodiment 18. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
transmit, to a wireless device, a Narrowband Secondary Synchronization Signal (NSSS) transmit diversity scheme for performing at least one radio resource management (RRM) measurement across NSSS and Narrowband Reference Signal (NRS) in an aligned manner.

Embodiment 19. The communication system of embodiment 18, further including the base station.

Embodiment 20. The communication system of embodiment 19, further including the UE, wherein the UE is configured to communicate with the base station.

Embodiment 21. The communication system of embodiment 20, wherein:
the processing circuitry of the host computer is configured to execute a host application, thereby providing the user data; and
the UE comprises processing circuitry configured to execute a client application associated with the host application.

Embodiment 22. A method by a network node for explicit measurement definition comprises:
transmitting, to a wireless device, a Narrowband Secondary Synchronization Signal (NSSS) transmit diversity scheme for performing at least one radio resource management (RRM) measurement across NSSS and Narrowband Reference Signal (NRS) in an aligned manner.

Embodiment 23. The method of embodiment 22, wherein the NSSS transmit delivery scheme comprises a number of NSSS antenna ports and a precoder matrix that defines a mapping from the NSSS antenna ports to physical antenna ports.

Embodiment 24. The method of embodiment 22, wherein the NSSS transmit diversity scheme configures the wireless device to perform the at least one RRM measurement to be performed on N subsequent NSSS subframes at a time, where N is an integer number.

Embodiment 25. The method of embodiment 24, wherein the NSSS transmit diversity scheme configures the wireless device to estimate the at least one RRM measurement on M>N NSSS measurement occasions, but for each measurement occasion, N subsequent NSSS subframes are sampled.

Embodiment 26. The method of embodiment 22, wherein the NSSS transmit diversity scheme configures the wireless device to perform the at least one RRM measurement on K NRS antenna ports, where K is an integer number.

Embodiment 27. The method of embodiment 26, wherein the NSSS transmit diversity scheme configures the wireless device to estimate the at least one RRM measurement on M>K measurement occasions, while trying to get an equal distribution of NRS measurements on K antenna ports over the M measurement occasions.

Embodiment 28. The method of embodiment 22, wherein the NSSS transmit diversity scheme configures the wireless device to perform the at least one RRM measurement on a distinct set of NRS antenna ports.

Embodiment 29. The method of embodiment 28, further comprising transmitting the distinct set of NRS antenna ports to the wireless device.

Embodiment 30. The method of embodiment 28, wherein the distinct set of NRS antenna ports are based on a specification.

Embodiment 31. The method of embodiments 22 to 30, wherein the NSSS transmit diversity scheme broadcasted in a master information block or system information block.

Embodiment 32. The method of embodiments 22 to 30, wherein the NSSS transmit diversity scheme is transmitted as part of a paging message information block or as part of the Direct Indication.

Embodiment 33. The method of embodiments 22 to 30, wherein the NSSS transmit diversity scheme is transmitted in a dedicated radio resource configuration (RRC) information element (IE) or a layer-1 control message.

Embodiment 34. The method of embodiment 33, wherein:
the RRC IE may be included in the RRC release message;
the RRC IE may be part of the PhysicalConfigDedicated-NB-r13 IE in the RadioResourceConfigDedicated-NB message; or
the RRC IE may be part of the MeasConfig message.

Embodiment 35. The method of embodiment 33, wherein:
the layer-1 control message may be included in DL SCH using one of the unused LCID space; or
the layer-1 control message may be included in DL SCH by reinterpreting one of the used LCID space.

Embodiment 36. The method of embodiments 22 to 35, wherein the NSSS transmit diversity scheme identifies a number of NRS ports through different CRC masking, wherein a mask n applied to CRC indicates that there are n NRS ports.

Embodiment 37. The method of embodiments 22 to 35, wherein:
the NSSS transmit diversity scheme identifies whether NSSS can be used for measurement in a cell, and the wireless device may determine a number of NSSS antenna ports, the precoder matrix that defines the mapping from the NSSS antenna ports to the physical antenna ports, and other information based on a specification.

Embodiment 38. The method of embodiments 22 to 35, wherein the at least one RRM measurement comprises:
at least one Narrowband Signal Received Power (NRSRP) measurement;
at least one Reference Signal Received Power (RSRP) measurement;
at least one Received Signal Strength Indicator (RSSI) measurement; or
at least one Reference Signal Received Quality (RSRQ) measurement.

Embodiment 39. A computer program product comprising a non-transitory computer readable medium storing computer readable program code, the computer readable program code comprises program code for performing any of the methods of embodiments 22 to 38.

Embodiment 40. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs transmit, to a wireless device, a Narrowband Secondary Synchronization Signal (NSSS) transmit diversity scheme for performing at least one radio resource management (RRM) measurement across NSSS and Narrowband Reference Signal (NRS) in an aligned manner.

Embodiment 41. The method of embodiment 40, further comprising:
at the base station, transmitting the user data.

Embodiment 42. The method of embodiment 41, wherein the user data is provided at the host computer by executing a host application, the method further comprising:
at the UE, executing a client application associated with the host application.

Embodiment 43. A wireless device for explicit measurement definition, the wireless device comprising:
memory operable to store instructions; and
processing circuitry operable to execute the instructions to cause the wireless device to:
receive information relating to a Narrowband Secondary Synchronization Signal (NSSS) transmit diversity scheme; and
based on the NSSS transmit diversity scheme, perform at least one radio resource management (RRM) measurement across NSSS and Narrowband Reference Signal (NRS) in an aligned manner.

Embodiment 44. The wireless device of embodiment 43, wherein the NSSS transmit delivery scheme comprises a number of NSSS antenna ports and a precoder matrix that defines a mapping from the NSSS antenna ports to physical antenna ports.

Embodiment 45. The wireless device of embodiment 43, wherein performing the at least one RRM measurement comprises perform the at least one RRM measurement on N subsequent NSSS subframes at a time, where N is an integer number.

Embodiment 46. The wireless device of embodiment 45, wherein performing the at least one RRM measurement comprises estimating the at least one RRM measurement on M>N NSSS measurement occasions, but for each measurement occasion, N subsequent NSSS subframes are sampled.

Embodiment 47. The wireless device of embodiment 43, wherein performing the at least one RRM measurement comprises performing the at least one RRM measurement on K NRS antenna ports, where K is an integer number.

Embodiment 48. The wireless device of embodiment 47, wherein performing the at least one RRM measurement comprises estimating the at least one RRM measurement on M>K measurement occasions, while trying to get an equal distribution of NRS measurements on K antenna ports over the M measurement occasions.

Embodiment 49. The wireless device of embodiment 43, wherein performing the at least one RRM measurement comprises performing the at least one RRM measurement on a distinct set of NRS antenna ports.

Embodiment 50. The wireless device of embodiment 49, wherein the distinct set of NRS antenna ports are received from the network node.

Embodiment 51. The wireless device of embodiment 49, wherein the distinct set of NRS antenna ports are determined based on a specification.

Embodiment 52. The wireless device of embodiments 43 to 51, wherein the NSSS transmit diversity scheme is received in a master information block or system information block.

Embodiment 53. The wireless device of embodiments 43 to 51, wherein the NSSS transmit diversity scheme is received as part of a paging message information block or as part of the Direct Indication.

Embodiment 54. The wireless device of embodiments 43 to 51, wherein the NSSS transmit diversity scheme is received in a dedicated radio resource configuration (RRC) information element (IE) or a layer-1 control message.

Embodiment 55. The wireless device of embodiment 54, wherein:
the RRC IE may be included in the RRC release message;
the RRC IE may be part of the PhysicalConfigDedicated-NB-r13 IE in the RadioResourceConfigDedicated-NB message; or
the RRC IE may be part of the MeasConfig message.

Embodiment 56. The wireless device of embodiment 54, wherein:
the layer-1 control message may be included in DL SCH using one of the unused LCID space; or
the layer-1 control message may be included in DL SCH by reinterpreting one of the used LCID space.

Embodiment 57. The wireless device of embodiments 43 to 56, wherein the NSSS transmit diversity scheme identifies a number of NRS ports through different CRC masking, wherein a mask n applied to CRC indicates that there are n NRS ports.

Embodiment 58. The wireless device of embodiment 57, further comprising:
trying each of the plurality of CRC masks;
determining a particular one of the plurality of CRC masks results in a correct CRC; and
performing continuous NRSRP measurements on N subsequent NSSS subframes.

Embodiment 59. The wireless device of embodiments 43 to 58, wherein:
the NSSS transmit diversity scheme identifies whether NSSS can be used for measurement in a cell, and
the processing circuitry is further operable to execute the instructions to cause the wireless device to determine a number of NSSS antenna ports, the precoder matrix that defines the mapping from the NSSS antenna ports to the physical antenna ports, and other information based on a specification.

Embodiment 60. The wireless device of embodiments 43 to 59, wherein the at least one RRM measurement comprises:
at least one Narrowband Signal Received Power (NRSRP) measurement;
at least one Reference Signal Received Power (RSRP) measurement;
at least one Received Signal Strength Indicator (RSSI) measurement; or
at least one Reference Signal Received Quality (RSRQ) measurement.

Embodiment 61. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to
receive information relating to a Narrowband Secondary Synchronization Signal (NSSS) transmit diversity scheme; and
based on the NSSS transmit diversity scheme, perform at least one radio resource management (RRM) measurement across NSSS and Narrowband Reference Signal (NRS) in an aligned manner.

Embodiment 62. The communication system of embodiment 61, further including the UE.

Embodiment 63. The communication system of embodiment 62, wherein the cellular network further includes a base station configured to communicate with the UE.

Embodiment 64. The communication system of embodiment 62 or 63, wherein:
the processing circuitry of the host computer is configured to execute a host application, thereby providing the user data; and
the UE's processing circuitry is configured to execute a client application associated with the host application.

Embodiment 65. A method by a wireless device for explicit measurement definition, the method comprising:
receive information relating to a Narrowband Secondary Synchronization Signal (NSSS) transmit diversity scheme; and
based on the NSSS transmit diversity scheme, perform at least one radio resource management (RRM) measurement across NSSS and Narrowband Reference Signal (NRS) in an aligned manner.

Embodiment 66. The method of embodiment 65, wherein the NSSS transmit delivery scheme comprises a number of NSSS antenna ports and a precoder matrix that defines a mapping from the NSSS antenna ports to physical antenna ports.

Embodiment 67. The method of embodiment 65, wherein performing the at least one RRM measurement comprises perform the at least one RRM measurement on N subsequent NSSS subframes at a time, where N is an integer number.

Embodiment 68. The method of embodiment 67, wherein performing the at least one RRM measurement comprises estimating the at least one RRM measurement on M>N NSSS measurement occasions, but for each measurement occasion, N subsequent NSSS subframes are sampled.

Embodiment 69. The method of embodiment 65, wherein performing the at least one RRM measurement comprises performing the at least one RRM measurement on K NRS antenna ports, where K is an integer number.

Embodiment 70. The method of embodiment 69, wherein performing the at least one RRM measurement comprises estimating the at least one RRM measurement on M>K measurement occasions, while trying to get an equal distribution of NRS measurements on K antenna ports over the M measurement occasions.

Embodiment 71. The method of embodiment 65, wherein performing the at least one RRM measurement comprises performing the at least one RRM measurement on a distinct set of NRS antenna ports.

Embodiment 72. The method of embodiment 71, wherein the distinct set of NRS antenna ports are received from the network node.

Embodiment 73. The method of embodiment 71, wherein the distinct set of NRS antenna ports are determined based on a specification.

Embodiment 74. The method of embodiments 65 to 73, wherein the NSSS transmit diversity scheme is received in a master information block or system information block.

Embodiment 75. The method of embodiments 65 to 73, wherein the NSSS transmit diversity scheme is received as part of a paging message information block or as part of the Direct Indication.

Embodiment 76. The method of embodiments 65 to 73, wherein the NSSS transmit diversity scheme is received in a dedicated radio resource configuration (RRC) information element (IE) or a layer-1 control message.

Embodiment 77. The method of embodiment 76, wherein:
the RRC IE may be included in the RRC release message;
the RRC IE may be part of the PhysicalConfigDedicated-NB-r13 IE in the RadioResourceConfigDedicated-NB message; or
the RRC IE may be part of the MeasConfig message.

Embodiment 78. The method of embodiment 76, wherein:
the layer-1 control message may be included in DL SCH using one of the unused LCID space; or
the layer-1 control message may be included in DL SCH by reinterpreting one of the used LCID space.

Embodiment 79. The method of embodiments 65 to 78, wherein the NSSS transmit diversity scheme identifies a number of NRS ports through different CRC masking, wherein a mask n applied to CRC indicates that there are n NRS ports.

Embodiment 80. The method of embodiment 79, further comprising:
trying each of the plurality of CRC masks;
determining a particular one of the plurality of CRC masks results in a correct CRC; and
performing continuous NRSRP measurements on N subsequent NSSS subframes.

Embodiment 81. The method of embodiments 65 to 80, wherein:
the NSSS transmit diversity scheme identifies whether NSSS can be used for measurement in a cell, and
the method further comprises determining a number of NSSS antenna ports, the precoder matrix that defines the mapping from the NSSS antenna ports to the physical antenna ports, and other information based on a specification.

Embodiment 82. The method of embodiments 65 to 81, wherein the at least one RRM measurement comprises:
at least one Narrowband Signal Received Power (NRSRP) measurement;
at least one Reference Signal Received Power (RSRP) measurement;
at least one Received Signal Strength Indicator (RSSI) measurement; or
at least one Reference Signal Received Quality (RSRQ) measurement.

Embodiment 83. A computer program product comprising a non-transitory computer readable medium storing computer readable program code, the computer readable program code comprises program code for performing any of the methods of embodiments 65 to 82.

Embodiment 84. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE
receives information relating to a Narrowband Secondary Synchronization Signal (NSSS) transmit diversity scheme; and
based on the NSSS transmit diversity scheme, performs at least one radio resource management (RRM) measurement across NSSS and Narrowband Reference Signal (NRS) in an aligned manner.

Embodiment 85. The method of embodiment 84, further comprising:
at the UE, receiving the user data from the base station.

ADDITIONAL INFORMATION; On NSSS Measurement Accuracy in Transmit Diversity

Improvement of NB-IoT measurement accuracy may be by means of using NSSS as proxy for NRS when determining NRSRP. One issue that has been identified is that the flexibility in antenna ports used for transmission of NSSS may pose a problem for the UE, since different combinations of ports lead to different propagation paths and/or beamforming effects. In current specifications, the UE has no idea of the transmission port pattern used by the eNodeB since such transmission schemes typically are proprietary, and may therefore end up measuring consistently on the worst beam or propagation path, and therefore underestimate the NRSRP. It has beenidentified that the antenna port(s) used for the measurement may vary arbitrarily across subframes and across cells in NSSS.

In this disclosure, the issue is further investigated by means of simulations, based on which it is proposed that the UE shall be given information on how the NSSS transmit diversity configuration changes in order to avoid measuring consistently on the least favorable configuration.

Simulations: A set of simulations with parameters provided in Table 1 has been carried out. In a first subset a transmit diversity scheme with the same signal being transmitted from both TX ports has been used, and in a second subset, the sign of the second TX port has been randomized between different NSSS occasions.

The first subset of simulations models that the UE consistently is measuring on the same transmit diversity configuration throughout the L1 measurement period, and the second subset models that the UE is measuring on both transmit diversity configurations.

TABLE 1

| Simulation parameters | | |
|---|---|---|
| Parameters | Value | Comments |
| L1 measurement period | 1600 ms | |
| Measurement sampling rate | 1 sample/20 ms | Implementation dependent |
| L3 filtering | Disabled | |
| Donor cell antenna configuration | 2TX | Puncturing of NPSS and NSSS in in-band operation when colliding with 2TX CRS pattern |
| NB-IoT antenna configuration | 2TX-1RX | |
| Channel model | AWGN, ETU 1 Hz | Models stationary device |

TABLE 1-continued

Simulation parameters

| Parameters | Value | Comments |
| --- | --- | --- |
| Measurement type | Synchronization signal (NSSS) | |
| NSSS transmit diversity | $\frac{1}{\sqrt{2}}[1 \ \ 1]$ | Equal sign on both TX ports |
| | $\frac{1}{\sqrt{2}}[1 \ \pm 1]$ | Randomized sign on second TX port |
| CP length | Normal | |
| Carrier frequency | 2 GHz | |
| Es/Iot | −15 dB, −12.6 dB, −6 dB | AWGN noise |
| Frequency error modelling | +/−50 Hz | With respect to reference cell |

Figure 24:
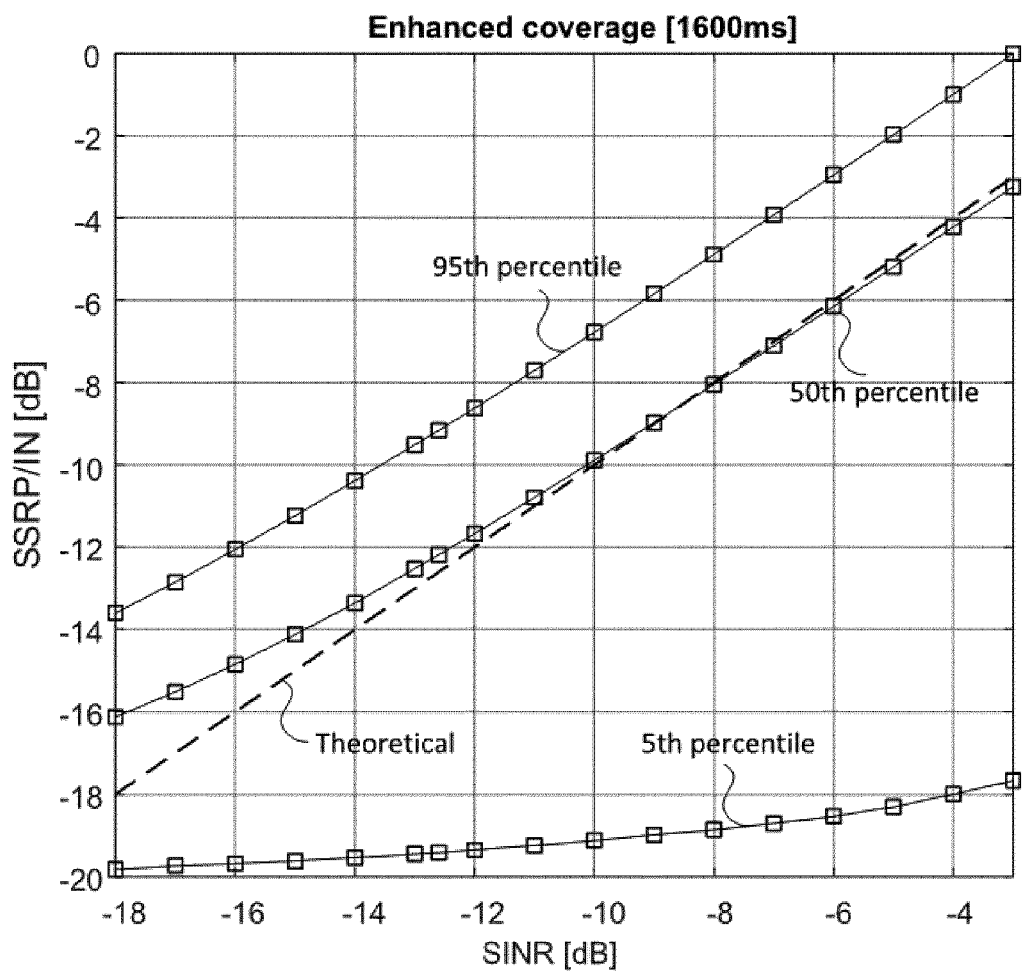
FIG. 24 illustrates NSSS received power estimates in AWGN propagation conditions for transmit diversity with same sign on both TX ports, according to one embodiment.
Figure 25:
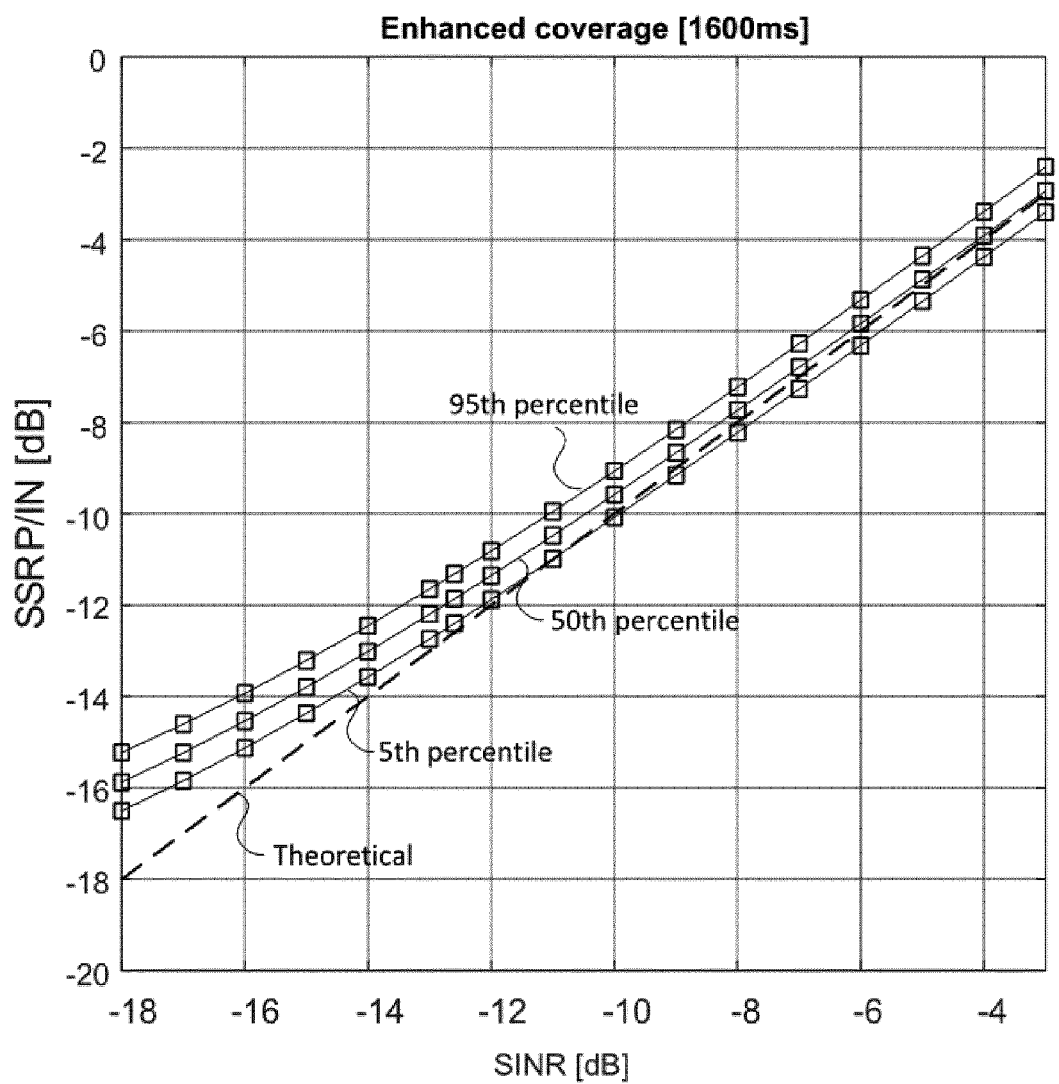
FIG. 25 illustrates NSSS received power estimates in AWGN propagation conditions for transmit diversity with randomized sign of second TX port, according to one embodiment.
Figure 26:
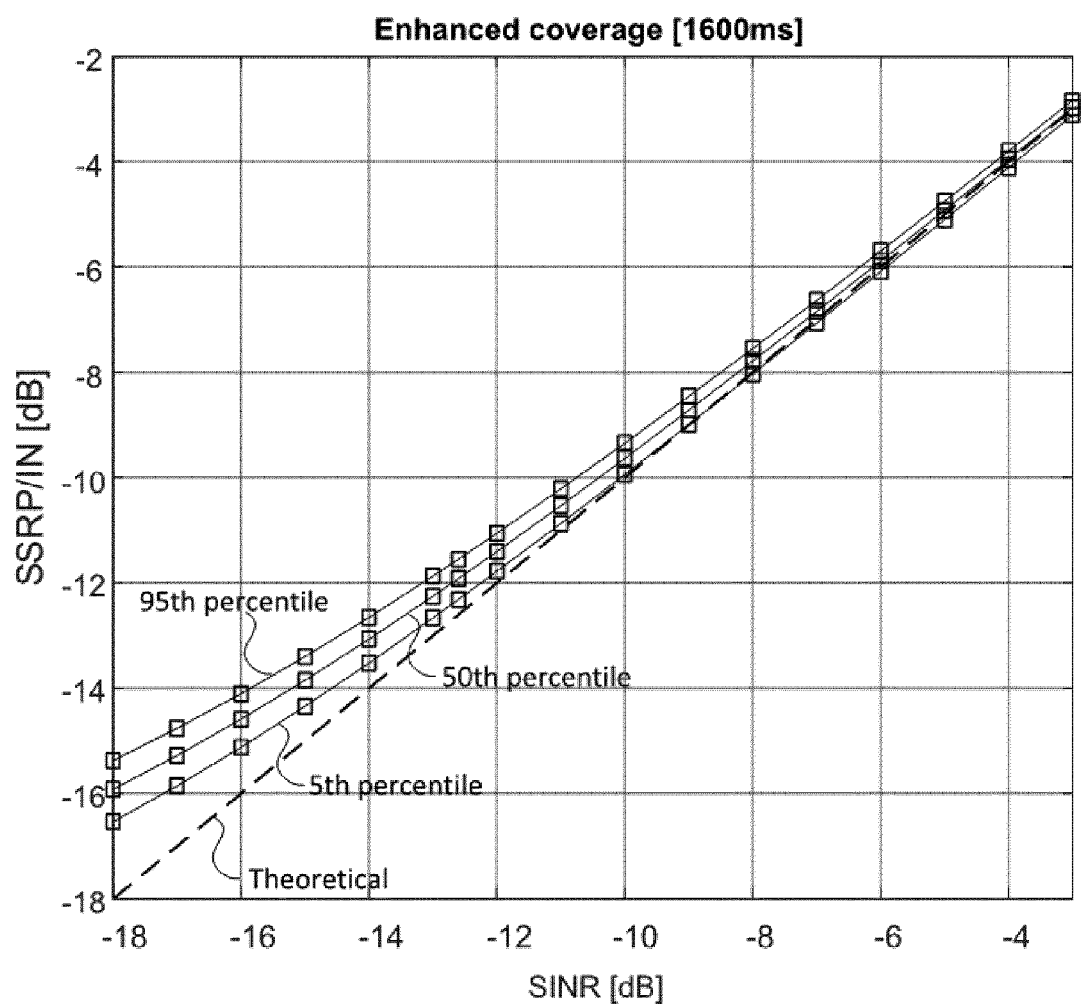
FIG. 26 illustrates single Tx port simulation results from R4-1711453 "On measurements accuracy when using NSSS and NRS", Ericsson, for reference, for AWGN, according to one embodiment.

The simulation results for static one-tap channel (LOS) and ETU 1 Hz channel between each TX port and the UE RX antenna are shown in FIG. 24 and FIG. 25 for static transmission scheme and randomized sign of second TX port, respectively. Specifically, FIG. 24 illustrates NSSS received power estimates in AWGN propagation conditions for transmit diversity with same sign on both TX ports, and FIG. 25 illustrates NSSS received power estimates in AWGN propagation conditions for transmit diversity with randomized sign of second TX port. FIG. 26 illustrates single Tx port simulation results from R4-1711453 "On measurements accuracy when using NSSS and NRS", Ericsson, for reference, for AWGN.

Figure 27:
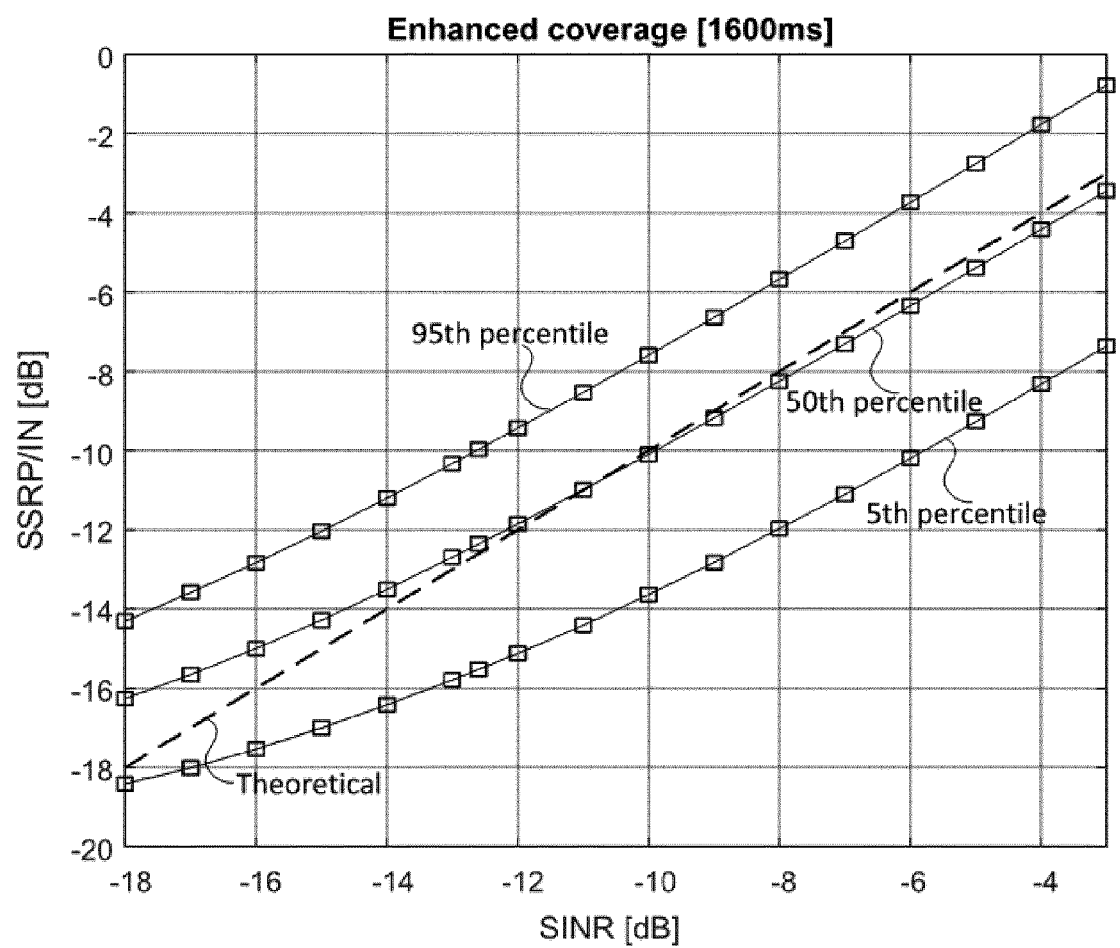
FIG. 27 illustrates NSSS received power estimates in ETU 1 Hz propagation conditions for transmit diversity with same sign on both TX ports, according to one embodiment.
Figure 28:
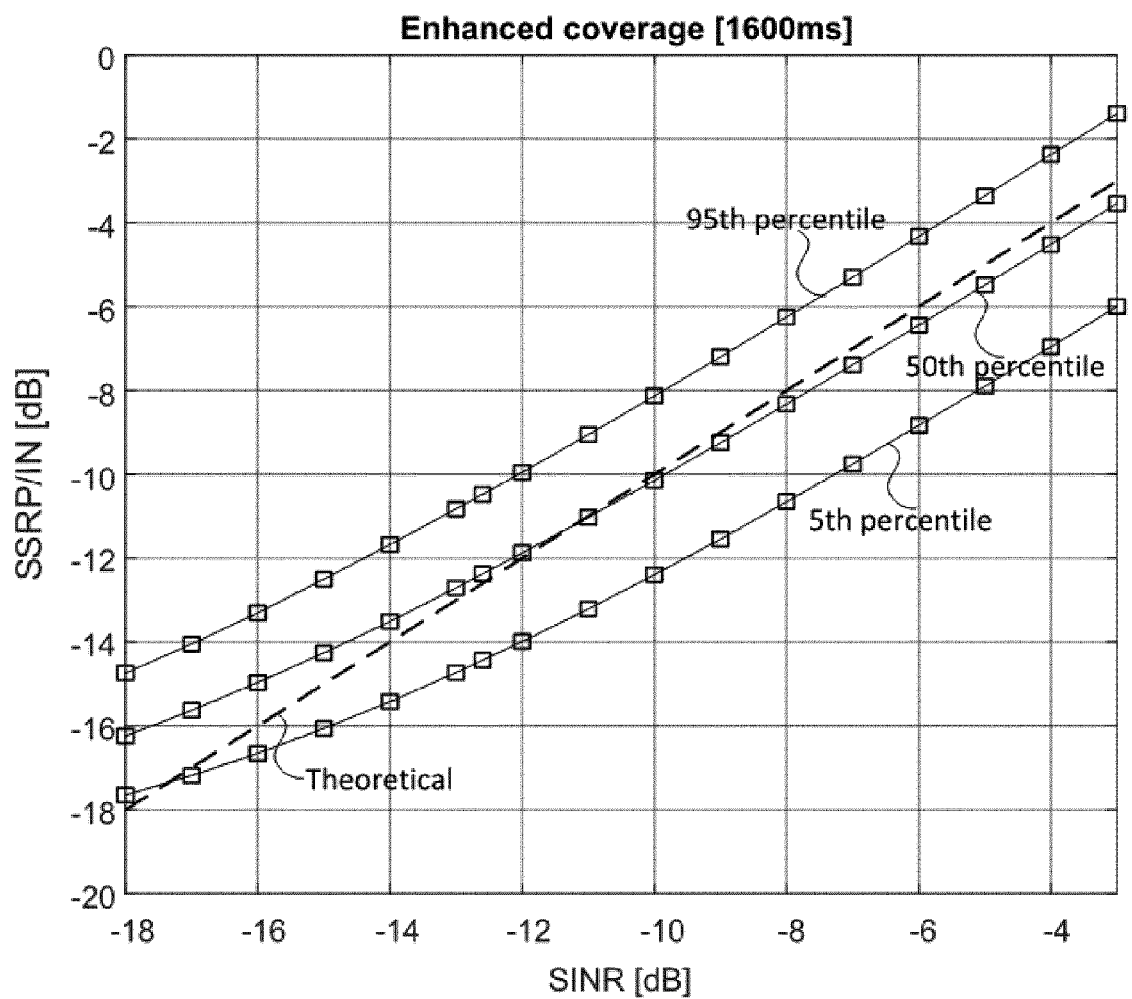
FIG. 28 illustrates NSSS received power estimates in ETU 1 Hz propagation conditions for transmit diversity with randomized sign of second TX port, according to one embodiment.
Figure 29:
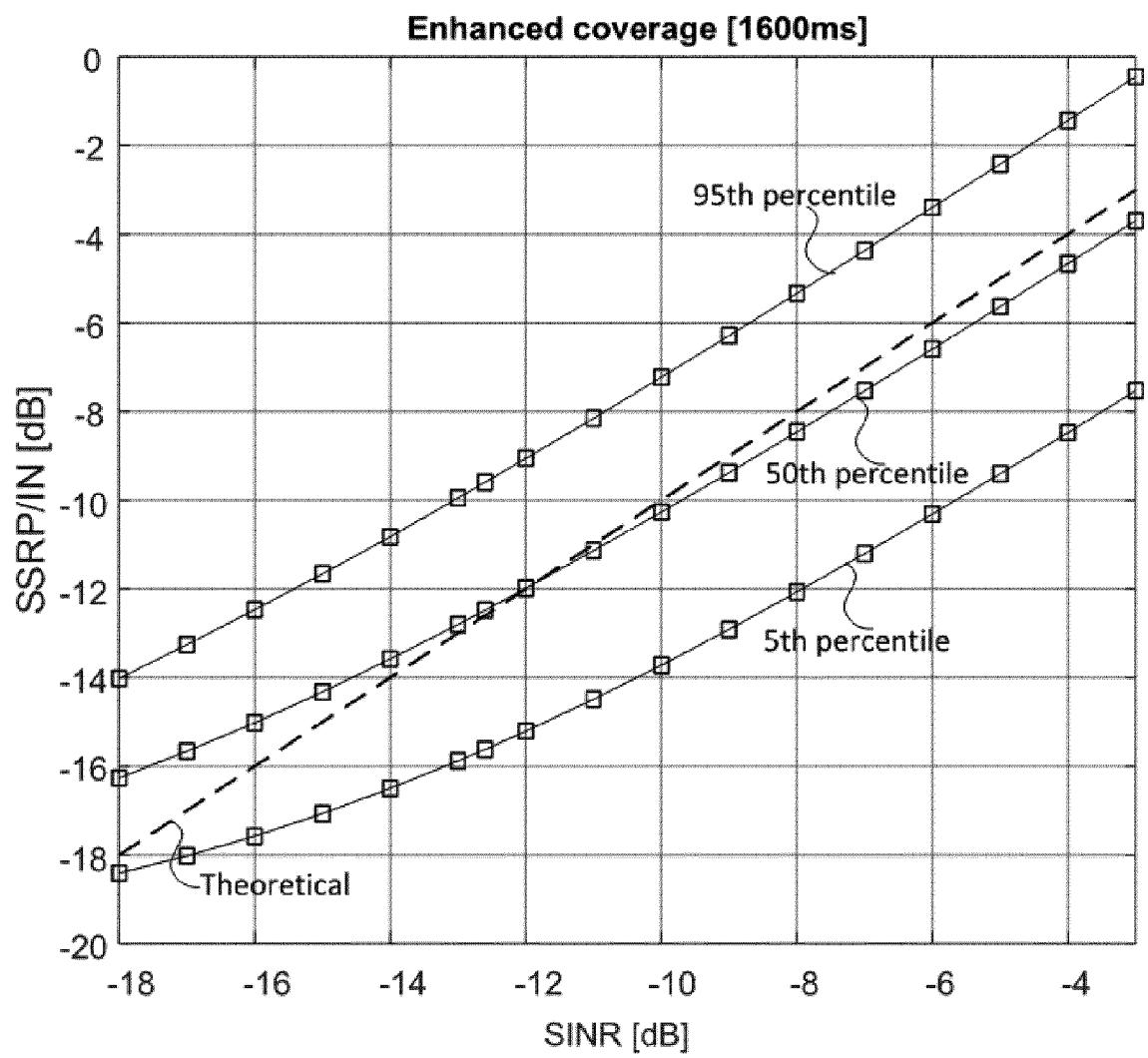
FIG. 29 single Tx port simulation results from R4-1711453 "On measurements accuracy when using NSSS and NRS", Ericsson, for reference, for ETU 1 Hz, according to one embodiment.

FIG. 27 illustrates NSSS received power estimates in ETU 1 Hz propagation conditions for transmit diversity with same sign on both TX ports, and FIG. 28 illustrates NSSS received power estimates in ETU 1 Hz propagation conditions for transmit diversity with randomized sign of second TX port. FIG. 29 single Tx port simulation results from R4-1711453 "On measurements accuracy when using NSSS and NRS", Ericsson, for reference, for ETU 1 Hz.

Discussion: The simulation results indicate that in case of a base station that transmits NSSS from more than one physical Tx port, a static one-tap propagation channel (AWGN), and a UE that consistently measures on the same transmit diversity configuration, the SSRP (NRSRP) often is significantly under-estimated (See, FIG. 24, $5^{th}$ percentile). When the UE instead alternates between measuring on the different transmit diversity configurations, the situation is improved (See, FIG. 25). Comparing the latter with simulation results for transmission of NSSS from single physical Tx antenna port (See, FIG. 26), the variability of the results is somewhat larger, about ±0.5dB, but otherwise similar to that for a single physical Tx antenna port.

For fading conditions there is no significant difference between the case where the base station transmits from two physical Tx ports and the UE consistently measures on the same transmit diversity configuration (See, FIG. 28) and single physical Tx port case (See, FIG. 29). For the scenario where the UE is measuring on both transmit diversity configurations (see FIG. 28), the result even improves over the result from the single Tx port case in that the variability reduces.

Observation 1: Transmit diversity of NSSS may pose a problem for the UE's measurement accuracy when the UE is in static propagation conditions, and only if the UE is consistently measuring on the same transmit diversity configuration throughout the L1 measurement period.

Observation 2: Transmit diversity of NSSS seems not to have a negative impact on the measurement accuracy for UEs in fading conditions.

The results for AWGN can be explained as follows. The AWGN model is based on that the phase introduced by the radio channel is randomized within [0,2π] and then applied throughout the whole simulation (L1 period in this case). When transmitting the same information from two Tx ports, and receiving the information with one Rx antenna, the UE sees the linear combination of two replicas of the same signal but with randomized phases. The linear combination may be destructive or constructive. In the former case in the worst case the two signal paths may cancel each other completely, and in the latter case they may result in that twice the energy is received.

Figure 30:
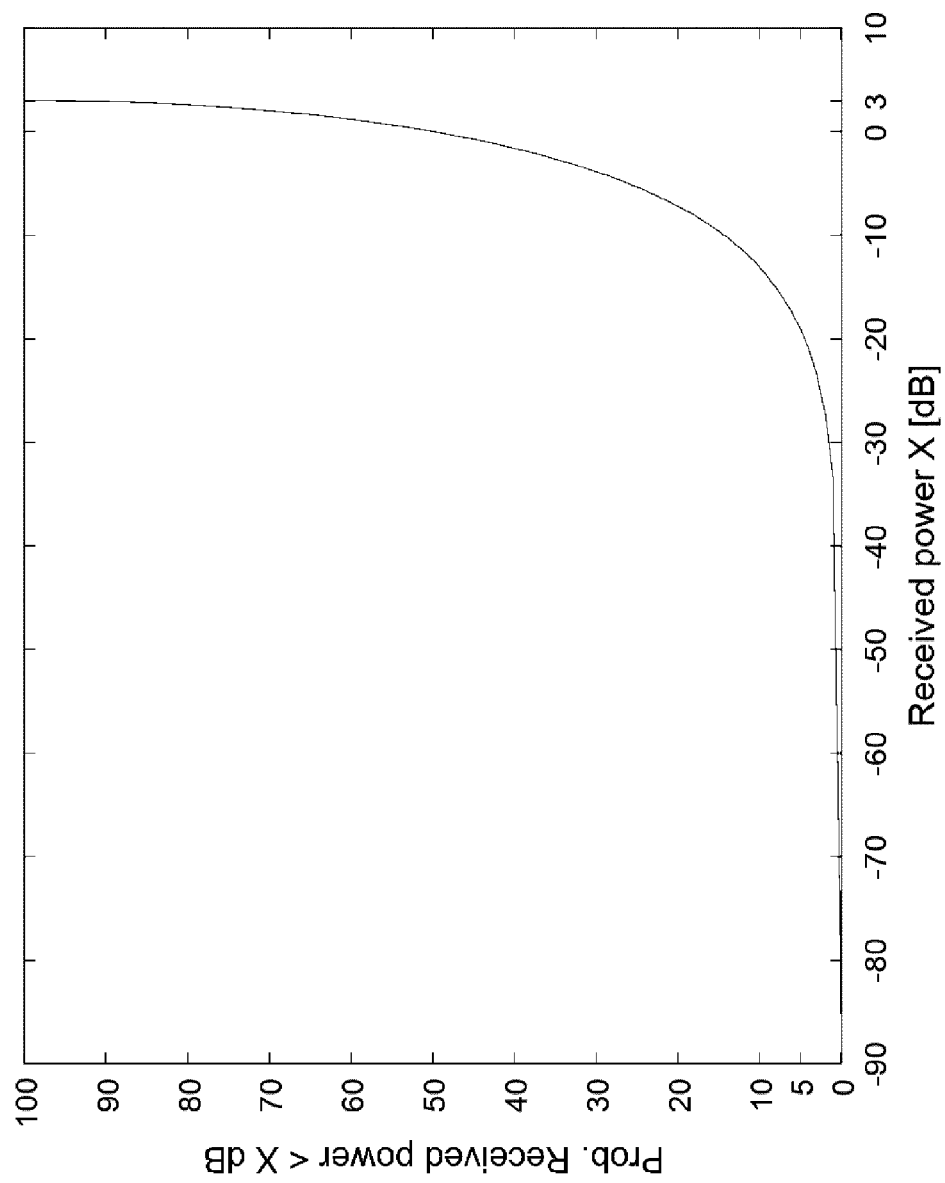
FIG. 30 illustrates CDF, according to certain embodiments.

FIG. 30 illustrates CDF. Looking at the CDF of the power of $$\frac{1}{\sqrt{2}}e^{j\alpha} + \frac{1}{\sqrt{2}}e^{j\beta},$$

where α and β each are randomized within [0,2π], FIG. 30, it is clear that the $5^{th}$ percentile represents significant annihilation of the transmitted signals at the receiver. When instead alternating between measuring $$\frac{1}{\sqrt{2}}e^{j\alpha} + \frac{1}{\sqrt{2}}e^{j\beta} \text{ and } \frac{1}{\sqrt{2}}e^{j\alpha} - \frac{1}{\sqrt{2}}e^{j\beta},$$

the received signal will alternate between destructive and constructive combination of the transmitted signals. If measuring both transmit diversity configurations the same number of times during a L1 measurement period, the result will be similar to the single physical TX port case.

For the fading scenario, here represented by ETU 1 Hz, the relative phase between the two propagation paths changes throughout the L1 measurement period and therefore the received power comprises a mix of destructive and constructive combining of the transmitted signals.

Based on the description above, the present disclosure identifies that the UE needs information on how the NSSS transmit diversity configuration changes, in order to prevent it from measuring only on NSSS occasions using the same—and potentially least favorable—configuration.

In some aspects, when NSSS transmit diversity is employed, the UE shall get information on how the transmit diversity configuration changes, in order to prevent the UE from consistently measuring on the least favorable configuration.

It shall be noted that since NSSS transmit diversity is open in the RAN1 specifications and donor cells (in-band and guard-band scenarios) may have more than two physical Tx ports, there may be more than two NSSS transmit diversity configurations in use. This needs to be taken into account when specifying the information to be conveyed to the UE.

Conclusion: In this disclosure the impact on NSSS transmit diversity on the measured NSSS received power has been analyzed. The following observations were made:

Observation 1: Transmit diversity of NSSS may pose a problem for the UE's measurement accuracy when the UE is in static propagation conditions, and only if the UE is consistently measuring on the same transmit diversity configuration throughout the L1 measurement period.

Observation 2: Transmit diversity of NSSS seems not to have a negative impact on the measurement accuracy for UEs in fading conditions.

Aspects of the disclosure are: When NSSS transmit diversity is employed, the UE shall get information on how the transmit diversity configuration changes, in order to prevent the UE from consistently measuring on the least favorable configuration. Further information is provided in R4-1713583.

ADDITIONAL INFORMATION; LS reply on narrowband measurement accuracy enhancement

Further information is found in R4-1711893. Aspects relate to issues for the NSSS-based measurement accuracy related to usage of transmit diversity schemes for transmission of NSSS.

The following issues are found:
The transmit diversity scheme in use may have a negative impact on UEs that experience static propagation conditions, in that the UE consistently unknowingly might conduct power measurements at NSSS occasions for which the received signal is least favourable.
The negative impact of the transmit diversity scheme can be avoided if the UE during the L1 measurement period measures equally on both transmit diversity configurations in use.

If the UE knows the transmit diversity scheme in use, e.g. the number of NSSS transmit diversity configurations that are cycled through over consecutive NSSS occasions, the UE can adapt the measurement procedure to avoid conducting measurements only on one of the transmit diversity configurations in use. Such information may for instance be conveyed to the UE via specification, or be signalled to the UE.

ABBREVIATIONS

| Abbreviation | Explanation |
| --- | --- |
| 3GPP | 3$^{rd}$ Generation Partnership Project |
| BS | Base station |
| CRC | Cyclic Redundancy Check |
| DL | Downlink |
| eNB | Evolved NodeB |
| IoT | Internet of Things |
| LTE | Long-Term Evolution |
| MISO | Multiple Input Single Output |
| NB-IoT | Narrowband Internet of Things |
| NRS | Narrowband Reference Signal |
| NRSRP | Narrowband Reference Signal Received Power |
| NSSS | Narrowband Secondary Synchronization Signal |
| PRB | Physical Resource Block |
| RRC | Radio Resource Control (protocol) |
| UE | User Equipment |
| UL | Uplink |

Conclusion

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a wireless device, the method comprising:
receiving information relating to a Narrowband Secondary Synchronization Signal, NSSS, transmit diversity scheme, the information indicating the number of NSSS occasions that use different NSSS transmit diversity configurations, and
wherein the received indication is for use in performing at least one measurement across the NSSS occasions.

2. The method of claim 1, wherein the different NSSS transmit diversity configurations comprise a plurality of different precoders.

3. The method of claim 1, wherein performing the at least one measurement comprises performing the at least one measurement on an integer number, N, of consecutive NSSS transmissions that defines an NSSS transmit diversity period.

4. The method of claim 3, wherein performing the at least one measurement comprises performing the at least one measurement over a multitude of NSSS transmit diversity periods.

5. The method of claim 1, wherein performing the at least one measurement comprises determining an average over the number, N, of consecutive NSSS occasions.

6. The method of claim 1, wherein the NSSS transmit diversity scheme comprises a number, L, of NSSS antenna ports and a set of precoder matrices that for each NSSS occasion within a NSSS transmit diversity period defines the mapping from each NSSS antenna port to one or more physical antenna port(s) and/or;
wherein performing the at least one measurement comprises performing the at least one measurement on a number, K, of Narrowband Reference Signal, NRS, antenna ports, wherein K is an integer number.

7. The method of claim 1, wherein performing the at least one measurement comprises estimating the at least one measurement on a number, M, measurement occasions, while trying to get an equal distribution of NRS measurements on the number, K, of NRS antenna ports over the M measurement occasions, wherein M is greater than or equal to K.

8. The method of claim 1, wherein the at least one measurement comprises:
at least one Narrowband Signal Received Power, NRSRP, measurement;
at least one Reference Signal Received Power, RSRP, measurement;
at least one Received Signal Strength Indicator, RSSI, measurement; or
at least one Reference Signal Received Quality, RSRQ, measurement.

9. A wireless device, comprising:
memory storing instructions; and
processing circuitry operable to execute the instructions to cause the wireless device to:
receive information relating to a Narrowband Secondary Synchronization Signal, NSSS, transmit diversity scheme, the information indicating a number of NSSS occasions that use different NSSS transmit diversity configurations, and
wherein the received information is for performing at least one measurement across NSSS occasions.

10. The wireless device of claim 9, wherein the different NSSS transmit diversity configurations comprises a plurality of different precoders.

11. The wireless device of claim 9, wherein performing the at least one measurement comprises performing the at least one measurement on a number, N, of consecutive NSSS occasions at a time, wherein N is an integer number and/or
wherein performing the at least one measurement comprises estimating the at least one measurement during the number, M, of measurement occasions wherein during each measurement occasion, N subsequent NSSS subframes are sampled; and/or,
wherein performing the at least one measurement comprises determining an average over a number, N, of consecutive NSSS occasions.

12. The wireless device of claim 9, wherein each NSSS occasion comprises a subframe.

13. The wireless device of claim 9, wherein the NSSS transmit delivery scheme comprises a number, L, of NSSS antenna ports and some precoder matrix that indicates a mapping from each NSSS antenna port to a physical antenna port.

14. The wireless device of claim 9, wherein performing the at least one measurement comprises performing the at least one measurement on a number, K, of Narrowband Reference Signal, NRS, antenna ports, wherein K is an integer number; and optionally
wherein performing the at least one measurement comprises estimating the at least one measurement on a number, M, of measurement occasions, while trying to get an equal distribution of NRS measurements on the number, K, of NRS antenna ports over the M measurement occasions, wherein M is greater than or equal to K.

15. The wireless device of claim 9, wherein the at least one measurement comprises:
at least one Narrowband Signal Received Power, NRSRP, measurement;
at least one Reference Signal Received Power, RSRP, measurement;
at least one Received Signal Strength Indicator, RSSI, measurement; or
at least one Reference Signal Received Quality, RSRQ, measurement.

16. A method by a network node comprises:
determining a Narrowband Secondary Synchronization Signal, NSSS, transmit diversity scheme for transmitting a NSSS signal; and
transmitting, to a wireless device, information relating to the NSSS transmit diversity scheme for performance by the wireless device of at least one measurement across NSSS occasions, the information indicating a number of NSSS occasions that use different NSSS transmit diversity configurations.

17. The method of claim 16, wherein the different NSSS transmit diversity configurations comprise a plurality of different precoders.

18. The method of claim 16, wherein each NSSS occasion comprises a subframe.

19. The method of claim 16, wherein determining the NSSS transmit diversity scheme comprises determining a number, L, of NSSS antenna ports for transmitting the NSSS to the wireless device and/or
wherein the NSSS transmit delivery scheme comprises the number, L, of NSSS antenna ports and some precoder matrix that indicates a mapping from each of the number, L, of antenna ports to a physical antenna port; and/or,
further comprising transmitting a distinct set of Narrowband Reference Signal, NRS, antenna ports to the wireless device.

20. The method of claim 16, further comprising transmitting a distinct set of Narrowband Reference Signal, NRS, antenna ports to the wireless device.

21. The method of claim 20, wherein the distinct set of NRS antenna ports are based on a specification.

22. The method of claim 16, wherein transmitting the information relating to the NSSS transmit diversity scheme comprises broadcasting the information in a master information block or system information block.

23. The method of claim 16, wherein transmitting the information relating to the NSSS transmit diversity scheme comprises transmitting the information as part of a paging message information block or as part of the Direct Indication.

24. The method of claim 16, wherein transmitting the information relating to the NSSS transmit diversity scheme comprises transmitting the information in a dedicated radio resource configuration (RRC) information element (IE) or a layer-1 control message.

25. The method of claim 16, wherein the at least one measurement comprises:
at least one Narrowband Signal Received Power, NRSRP, measurement;
at least one Reference Signal Received Power, RSRP, measurement;
at least one Received Signal Strength Indicator, RSSI, measurement; or
at least one Reference Signal Received Quality, RSRQ, measurement.

26. A network node comprising:
memory storing instructions; and
processing circuitry operable to execute the instructions to cause the network node to:
determine a Narrowband Secondary Synchronization Signal, NSSS, transmit diversity scheme for transmitting a NSSS signal; and
transmit, to a wireless device, information relating to the NSSS transmit diversity scheme for performance by the wireless device of at least one measurement across NSSS occasions, the information indicating a number of NSSS occasions that use different NSSS transmit diversity configurations.

27. The network node of claim 26, wherein the different NSSS transmit diversity configurations comprise a plurality of different precoders.

28. The network node of claim 26, wherein each NSSS occasion comprises a subframe.

29. The network node of claim 26, wherein determining the NSSS transmit diversity scheme comprises determining a number, L, of NSSS antenna ports for transmitting the NSSS to the wireless device and optionally,
- wherein the NSSS transmit delivery scheme comprises the number, L, of NSSS antenna ports and some precoder matrix that indicates a mapping from each of the number, K, of antenna ports to a physical antenna port; and/or,
- wherein the processing circuitry is operable to execute the instructions to cause the network node to transmit a distinct set of Narrowband Reference Signal, NRS, antenna ports to the wireless device.

30. The network node of claim 26, wherein the at least one measurement comprises:
- at least one Narrowband Signal Received Power, NRSRP, measurement;
- at least one Reference Signal Received Power, RSRP, measurement;
- at least one Received Signal Strength Indicator, RSSI, measurement; or
at least one Reference Signal Received Quality, RSRQ, measurement.

\* \* \* \* \*

UNITED STATES PATENT AND TRADEMARK OFFICE
CERTIFICATE OF CORRECTION

PATENT NO. : 11,374,730 B2
APPLICATION NO. : 16/766208
DATED : June 28, 2022
INVENTOR(S) : Liberg et al.

Page 1 of 1

It is certified that error appears in the above-identified patent and that said Letters Patent is hereby corrected as shown below:

In the Specification

In Column 2, Line 37, delete "NRSRPNsss" and insert -- $NRSRP_{NSSS}$ --, therefor.

In Column 2, Line 38, delete "NRSRPNRs" and insert -- $NRSRP_{NRS}$ --, therefor.

In Column 2, Line 44, delete "NRSRPNRs" and insert -- $NRSRP_{NRS}$ --, therefor.

In Column 2, Lines 46-47, delete "NRSRPNRs and NRSRPNsss" and insert -- $NRSRP_{NRS}$ and $NRSRP_{NSSS}$ --, therefor.

In Column 2, Line 50, delete "NRSRPNRs" and insert -- $NRSRP_{NRS}$ --, therefor.

In Column 2, Line 51, delete "NRSRPNRs and NRSRPNsss" and insert -- $NRSRP_{NRS}$ and $NRSRP_{NSSS}$ --, therefor.

In Column 5, Line 67, delete "NRSRPNsss" and insert -- $NRSRP_{NSSS}$ --, therefor.

Signed and Sealed this
Sixteenth Day of April, 2024

*Katherine Kelly Vidal*

Katherine Kelly Vidal
*Director of the United States Patent and Trademark Office*